United States Patent
Khan et al.

(10) Patent No.: US 9,860,790 B2
(45) Date of Patent: Jan. 2, 2018

(54) MOBILE SERVICE ROUTING IN A NETWORK ENVIRONMENT

(71) Applicant: CISCO TECHNOLOGY, INC., San Jose, CA (US)

(72) Inventors: Muhammad A. Khan, Santa Clara, CA (US); Kevin D. Shatzkamer, Hingham, MA (US); Kirk McBean, North Wales, PA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 14/746,919

(22) Filed: Jun. 23, 2015

(65) Prior Publication Data

US 2015/0312801 A1    Oct. 29, 2015

Related U.S. Application Data

(63) Continuation of application No. 14/185,455, filed on Feb. 20, 2014, now Pat. No. 9,143,438, which is a
(Continued)

(51) Int. Cl.
*H04W 28/10* (2009.01)
*H04L 12/725* (2013.01)
(Continued)

(52) U.S. Cl.
CPC ............ *H04W 28/10* (2013.01); *H04L 45/22* (2013.01); *H04L 45/308* (2013.01);
(Continued)

(58) Field of Classification Search
CPC ..... H04W 28/10; H04W 40/00; H04W 40/34; H04L 45/22; H04L 45/308; H04L 61/2007; H04L 67/327
See application file for complete search history.

(56) References Cited

U.S. PATENT DOCUMENTS 3,629,512 A    12/1971  Yuan
4,769,811 A     9/1988  Eckberg et al.
(Continued)

FOREIGN PATENT DOCUMENTS

EP    2122483    7/2008
EP    2073449    6/2009
(Continued)

OTHER PUBLICATIONS

Bitar, N., et al., "Interface to the Routing System (I2RS) for Service Chaining: Use Cases and Requirements," Internet Engineering Task Force, draft-bitar-i2rs-service-chaining-01; Feb. 14, 2014; 15 pages.
(Continued)

*Primary Examiner* — Chandrahas Patel

(57) ABSTRACT

A data flow is received from a mobile network relating to a mobile subscriber. Subscriber data is received for the subscriber identifying a service path corresponding to the subscriber and at least one service policy corresponding to the subscriber, the service path including a set of network service nodes in a plurality of network service nodes. Packets of the data flow are routed according to the service path, the packets corresponding to a request for a resource. At least one packet is appended with service header data identifying the service policy. Each service node performs at least one service based on received request data, each service node in the set of service nodes performing a service defined in a service subscription of the subscriber. At least one particular service node in the set of network service nodes performs a particular service based at least in part on the service policy.

20 Claims, 7 Drawing Sheets

Related U.S. Application Data continuation of application No. 13/100,130, filed on May 3, 2011, now Pat. No. 8,743,885.

(51) Int. Cl.

| | | |
|---|---|---|
| *H04W 40/00* | (2009.01) | |
| *H04L 29/08* | (2006.01) | |
| *H04L 12/707* | (2013.01) | |
| *H04L 29/12* | (2006.01) | |
| *H04W 40/34* | (2009.01) | |
| *H04W 8/18* | (2009.01) | |
| *H04L 29/06* | (2006.01) | |
| *H04W 12/12* | (2009.01) | |
| *H04W 76/02* | (2009.01) | |

(52) U.S. Cl.
CPC ........ *H04L 61/2007* (2013.01); *H04L 67/327* (2013.01); *H04W 40/00* (2013.01); *H04W 40/34* (2013.01); *H04L 63/0227* (2013.01); *H04W 8/18* (2013.01); *H04W 12/12* (2013.01); *H04W 76/022* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 * | 6/2007 | Biswas ............. H04L 29/12367 370/465 |
| 7,231,462 B2 | 6/2007 | Berthaud et al. |
| 7,333,990 B1 | 2/2008 | Thiagarajan |
| 7,443,796 B1 | 10/2008 | Albert et al. |
| 7,458,084 B2 | 11/2008 | Zhang et al. |
| 7,486,622 B2 | 2/2009 | Regan et al. |
| 7,536,396 B2 | 5/2009 | Johnson et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad |
| 7,610,375 B2 | 10/2009 | Portolani et al. |
| 7,643,468 B1 | 1/2010 | Arregoces et al. |
| 7,644,182 B2 | 1/2010 | Banerjee |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda |
| 8,166,465 B2 | 4/2012 | Feblowitz et al. |
| 8,180,909 B2 | 5/2012 | Hartman et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,442,043 B2 | 5/2013 | Sharma et al. |
| 8,464,336 B2 | 6/2013 | Wei et al. |
| 8,520,672 B2 | 8/2013 | Guichard et al. |
| 8,601,152 B1 | 12/2013 | Chou |
| 8,612,612 B1 | 12/2013 | Dukes et al. |
| 8,676,980 B2 | 3/2014 | Kreeger et al. |
| 8,700,892 B2 | 4/2014 | Bollay |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian |
| 8,792,490 B2 | 7/2014 | Jabr et al. |
| 8,793,400 B2 | 7/2014 | McDysan |
| 8,825,070 B2 | 9/2014 | Akhtar et al. |
| 8,830,334 B2 | 9/2014 | Sharma et al. |
| 8,904,037 B2 | 12/2014 | Haggar et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | McDysan |
| 9,178,812 B2 | 11/2015 | Guichard et al. |
| 9,253,274 B2 | 2/2016 | Quinn et al. |
| 9,300,585 B2 | 3/2016 | Kumar et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,398,486 B2 | 7/2016 | La Roche, Jr. et al. |
| 9,413,655 B2 | 8/2016 | La Roche, Jr. et al. |
| 9,479,443 B2 | 10/2016 | Bosch et al. |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0088698 A1 | 5/2003 | Singh et al. |
| 2003/0110081 A1 | 6/2003 | Tosaki |
| 2003/0120816 A1 | 6/2003 | Berthaud et al. |
| 2003/0226142 A1 | 12/2003 | Rand |
| 2004/0109412 A1 | 6/2004 | Hansson |
| 2004/0148301 A1 | 7/2004 | Lake et al. |
| 2004/0148391 A1 | 7/2004 | Lake et al. |
| 2004/0199812 A1 | 10/2004 | Earl et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0086367 A1 | 4/2005 | Conta et al. |
| 2005/0152378 A1 | 7/2005 | Bango et al. |
| 2005/0160180 A1 | 7/2005 | Rabje et al. |
| 2005/0204042 A1 | 9/2005 | Banerjee |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan |
| 2006/0045024 A1 | 3/2006 | Previdi et al. |
| 2006/0074502 A1 | 4/2006 | McFarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0168223 A1 | 7/2006 | Mishra et al. |
| 2006/0233106 A1 | 10/2006 | Achlioptas et al. |

(56) References Cited

U.S. PATENT DOCUMENTS

| | | |
|---|---|---|
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn |
| 2008/0181118 A1 | 7/2008 | Sharma |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0204612 A1 | 8/2009 | Keshavarz-Nia et al. |
| 2009/0300207 A1 | 12/2009 | Giaretta |
| 2009/0300407 A1 | 12/2009 | Kamath et al. |
| 2009/0305699 A1 | 12/2009 | Deshpande |
| 2009/0328054 A1 | 12/2009 | Paramasivam et al. |
| 2010/0054260 A1 | 3/2010 | Pandey et al. |
| 2010/0063988 A1 | 3/2010 | Khalid |
| 2010/0080226 A1 | 4/2010 | Khalid et al. |
| 2010/0165985 A1 | 7/2010 | Sharma et al. |
| 2010/0214949 A1 | 8/2010 | Smith et al. |
| 2010/0254385 A1 | 10/2010 | Sharma et al. |
| 2010/0318784 A1 | 12/2010 | Rao et al. |
| 2011/0023090 A1 | 1/2011 | Asati et al. |
| 2011/0032833 A1 | 2/2011 | Zhang et al. |
| 2011/0055845 A1 | 3/2011 | Nandagopal |
| 2011/0131338 A1 | 6/2011 | Hu |
| 2011/0161494 A1 | 6/2011 | McDysan |
| 2011/0167471 A1 | 7/2011 | Riley et al. |
| 2011/0184807 A1 | 7/2011 | Wang et al. |
| 2011/0235508 A1 | 9/2011 | Goel |
| 2011/0246899 A1 | 10/2011 | Kwon et al. |
| 2011/0255538 A1 | 10/2011 | Srinivasan |
| 2011/0264905 A1 | 10/2011 | Ovsiannikov |
| 2011/0320580 A1 | 12/2011 | Zhou |
| 2012/0030365 A1 | 2/2012 | Lidstrom et al. |
| 2012/0087262 A1 | 4/2012 | Rasanen |
| 2012/0131662 A1 | 5/2012 | Kuik |
| 2012/0185853 A1 | 7/2012 | Haviv et al. |
| 2012/0278804 A1 | 11/2012 | Narayanasamy et al. |
| 2012/0281540 A1 | 11/2012 | Khan |
| 2012/0281544 A1 | 11/2012 | Anepu |
| 2012/0327767 A1 | 12/2012 | Ramakrishnan |
| 2012/0327947 A1 | 12/2012 | Cai |
| 2012/0331135 A1 | 12/2012 | Alon et al. |
| 2013/0003735 A1 | 1/2013 | Chao et al. |
| 2013/0003736 A1 | 1/2013 | Szyszko |
| 2013/0031271 A1 | 1/2013 | Bosch et al. |
| 2013/0040640 A1 | 2/2013 | Chen et al. |
| 2013/0044636 A1 | 2/2013 | Koponen |
| 2013/0086236 A1 | 4/2013 | Baucke et al. |
| 2013/0097323 A1 | 4/2013 | Barsness et al. |
| 2013/0121137 A1 | 5/2013 | Feng et al. |
| 2013/0121207 A1 | 5/2013 | Parker |
| 2013/0124708 A1 | 5/2013 | Lee |
| 2013/0125124 A1 | 5/2013 | Kempf et al. |
| 2013/0155902 A1 | 6/2013 | Feng et al. |
| 2013/0163594 A1 | 6/2013 | Sharma |
| 2013/0163606 A1 | 6/2013 | Bagepalli et al. |
| 2013/0188554 A1 | 7/2013 | Cai |
| 2013/0198412 A1 | 8/2013 | Saito |
| 2013/0215215 A1 | 8/2013 | Gage et al. |
| 2013/0215888 A1 | 8/2013 | Zhang et al. |
| 2013/0223290 A1 | 8/2013 | Zhou |
| 2013/0223449 A1 | 8/2013 | Koganti et al. |
| 2013/0235874 A1 | 9/2013 | Ringdahl et al. |
| 2013/0238774 A1 | 9/2013 | Davison et al. |
| 2013/0272305 A1 | 10/2013 | Lefebvre et al. |
| 2013/0279503 A1 | 10/2013 | Chiabaut |
| 2013/0311675 A1 | 11/2013 | Kancherla |
| 2013/0329584 A1 | 12/2013 | Ghose |
| 2014/0010084 A1 | 1/2014 | Kavunder et al. |
| 2014/0010085 A1 | 1/2014 | Kavunder et al. |
| 2014/0036730 A1 | 2/2014 | Nellikar |
| 2014/0050223 A1 | 2/2014 | Foo et al. |
| 2014/0059544 A1 | 2/2014 | Koganty et al. |
| 2014/0079070 A1 | 3/2014 | Sonoda et al. |
| 2014/0105062 A1 | 4/2014 | McDysan |
| 2014/0119367 A1 | 5/2014 | Han |
| 2014/0169215 A1 | 6/2014 | Rajendran et al. |
| 2014/0169375 A1 | 6/2014 | Khan et al. |
| 2014/0188676 A1 | 7/2014 | Marmolejo-Meillon et al. |
| 2014/0201374 A1 | 7/2014 | Ashwood-Smith et al. |
| 2014/0241247 A1 | 8/2014 | Kempf et al. |
| 2014/0254603 A1 | 9/2014 | Banavalikar |
| 2014/0259012 A1 | 9/2014 | Nandlall et al. |
| 2014/0279863 A1 | 9/2014 | Krishnamurthy |
| 2014/0280836 A1 | 9/2014 | Kumar et al. |
| 2014/0280950 A1 | 9/2014 | Bhanujan et al. |
| 2014/0304412 A1 | 10/2014 | Prakash et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard |
| 2014/0334488 A1 | 11/2014 | Guichard et al. |
| 2014/0344439 A1 | 11/2014 | Kempf et al. |
| 2014/0351452 A1 | 11/2014 | Bosch et al. |
| 2014/0362682 A1 | 12/2014 | Guichard et al. |
| 2014/0362857 A1 | 12/2014 | Guichard et al. |
| 2014/0372617 A1 | 12/2014 | Houyou et al. |
| 2014/0379938 A1 | 12/2014 | Bosch et al. |
| 2015/0003455 A1 | 1/2015 | Haddad et al. |
| 2015/0012988 A1 | 1/2015 | Jeng et al. |
| 2015/0026362 A1 | 1/2015 | Guichard |
| 2015/0052516 A1 | 2/2015 | French |
| 2015/0063102 A1 | 3/2015 | Mestery et al. |
| 2015/0063166 A1 | 3/2015 | Sif et al. |
| 2015/0071285 A1 | 3/2015 | Kumar et al. |
| 2015/0074276 A1 | 3/2015 | DeCusatis |
| 2015/0085870 A1 | 3/2015 | Narasimha et al. |
| 2015/0089082 A1 | 3/2015 | Patwardhan et al. |
| 2015/0092551 A1 | 4/2015 | Moisand |
| 2015/0106624 A1 | 4/2015 | Gero |
| 2015/0117308 A1 | 4/2015 | Kant |
| 2015/0120890 A1 | 4/2015 | Ghai |
| 2015/0124622 A1 | 5/2015 | Kovvali et al. |
| 2015/0131484 A1 | 5/2015 | Aldrin |
| 2015/0138973 A1 | 5/2015 | Kumar et al. |
| 2015/0156035 A1 | 6/2015 | Foo et al. |
| 2015/0172170 A1 | 6/2015 | Bosch et al. |
| 2015/0180767 A1 | 6/2015 | Tam et al. |
| 2015/0195197 A1 | 7/2015 | Yong |
| 2015/0215172 A1 | 7/2015 | Kumar |
| 2015/0222516 A1 | 8/2015 | Deval |
| 2015/0236948 A1 | 8/2015 | Dunbar |
| 2015/0263901 A1 | 9/2015 | Kumar et al. |
| 2015/0271102 A1 | 9/2015 | Antich |
| 2015/0271203 A1 | 9/2015 | Duminuco et al. |
| 2015/0271204 A1 | 9/2015 | Duminuco et al. |
| 2015/0271205 A1 | 9/2015 | Duminuco et al. |
| 2015/0282177 A1 | 10/2015 | Dong |
| 2015/0333930 A1 | 11/2015 | Aysola |
| 2015/0334027 A1 | 11/2015 | Bosch et al. |
| 2015/0334595 A1 | 11/2015 | Bosch et al. |
| 2015/0365322 A1 | 12/2015 | Shatzkamer et al. |
| 2016/0050132 A1 | 2/2016 | Zhang |
| 2016/0099853 A1 | 4/2016 | Nedeltchev et al. |
| 2016/0139939 A1 | 5/2016 | Bosch et al. |
| 2016/0226742 A1 | 8/2016 | Apathotharanan |
| 2016/0285720 A1 | 9/2016 | Maenpaa |

FOREIGN PATENT DOCUMENTS

| | | |
|---|---|---|
| EP | 2791802 | 6/2013 |
| EP | 2945329 | 11/2015 |
| WO | WO2005/104650 | 11/2005 |
| WO | WO2008/063858 | 5/2008 |
| WO | WO 2008/088954 | 7/2008 |

(56) References Cited

FOREIGN PATENT DOCUMENTS

| | | |
|---|---|---|
| WO | WO2011/012165 | 2/2011 |
| WO | WO2013/090035 | 6/2013 |
| WO | WO2013/095714 | 6/2013 |
| WO | WO2013/101765 | 7/2013 |
| WO | WO2014/189670 | 11/2014 |
| WO | WO2015/073190 | 5/2015 |
| WO | WO2015/094567 | 6/2015 |
| WO | WO2016/081379 | 5/2016 |

OTHER PUBLICATIONS

"3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

"3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015.

"3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.

"3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Valbonne—France, Mar. 2010; 116 pages.

"3GPP TS 29.212 V13.1.0 (Mar. 2015) Technical Specification: $3^{rd}$ Generation Partnership Project; Technical Specification Group Core Network and Terminals; Policy and Chargig Control (PCC); Reference points (Release 13)," $3^{rd}$ Generation Partnership Project (3GPP), 650 Route des Lucioles—Sophia Antipolis Valbonne—France, Mar. 2015; 230 pages.

"Comparison between OS virtualization and hypervisor-based virtualization," Servernest, Feb. 4, 2015, Copyright © 2009-2011 by ServerNest GmbH, 2 pages.

"ETSI TS 132 251 V12.7.0 (Oct. 2014) Technical Specification: Digital cellular telecommunications system (Phase 2+); Universal Mobile Telecommunications System (UMTS); LTE; Telecommunication management; Charging management; Packet Switched (PS) domain charging (3GPP TS 32.251 version 12.7.0 Release 12)," European Telecommunications Standards Institute (ETSI), 650 Route des Lucioles, F-06921 Sophia Antipolis Cedex—France, Oct. 2014; 164 pages.

Amazon Web Services, "Amazon Simple Workflow Service Developer Guide," API Version, Jan. 25, 2012, 175 pages http://aws.amazon. com/documentation/swf/.

Amir, et al., "An Active Service Framework and its Application to Real-time Multimedia Transcoding," in Proc. ACM SIGCOMM Conference {SIGCOMM '98}, Sep. 1998, 12 pages.

Bouthors, N.P., et al., "Metadata Transport in SFC," Network Working Group draft-bouthors-sfc-md-oo.txt, Sep. 19, 2014; 22 pages.

Carpenter, B., et al., "Using the IPv6 Flow Label for Equal Cost Multipath Routing and Link Aggregation in Tunnels," Network Working Group, RFC 6438, Nov. 2011, 9 pages; http://www.hjp.at/doc/rfc/rfc6438.html.

Chen, E., et al., "Outbound Route Filtering Capability for BGP-4," Network Working Group, RFC 5291, Aug. 2008, 12 pages; http://www.hjp.at/doc/rfc/rfc5291.html.

Cisco Systems, Inc., "Cisco vPath and vServices Reference Guide for Intercloud Fabric," Apr. 19, 2015, 48 pages http://www.cisco.com/c/en/us/td/docs/switches/datacenter/vsg/sw_vsg_ic/5_2_1_1C_2_2_1/vpath_vservices/reference/guide/vpath_vservices_reference.pdf.

Cisco Systems, Inc., "Call Flows for Dual-Stack PMIPv6 and GTP," Intelligent Wireless Access Gateway Configuration Guide, first published on or about Feb. 27, 2014; 14 pages.

Cisco Systems, Inc., "Cisco Quantum Services Platform," first published on or about Mar. 25, 2014; 2 pages.

Cisco Systems, Inc., "RADIUS Attribute 8 (Framed-IP-Address) in Access Requests," Sep. 8, 2009; 8 pages.

Cisco Systems, Inc., "RADIUS Vendor-Specific Attributes (VSA)," Cisco IOS Security Configuration Guide, first published on or about Sep. 13, 2014; 10 pages.

Elio Salvadori (Generalization virtual network topologies in OPENFlow-based networks, Dec. 2011, entire document, IEEE).

EPO Communication (1 page), European Search Opinion (3 pages) and Supplementary European Search Report (2 pages) mailed Apr. 7, 2010 for EP Application No. 08705725.3.

Fernando, et al., "Virtual Service Topologies in BGP VPNs," Internet Engineering Task Force (IETF) Internet-Draft, draft-rfernando-virt-topo-bgp-vpn-01, Oct. 22, 2012, 11 pages.

Haeffner, W., "Service Function Chaining Use Cases in Mobile Networks," Service Function Chaining Internet Draft draft-ietf-afc-use-case-mobility-03, Jan. 13, 2015; 25 pages.

Kiehle, Christian, et al., "Standardized Geoprocessing—Taking Spatial Data Infrastructures One Step Further", 9th Agile International Conference on Geographic Information Science, Apr. 22, 2006, 10 pages.

Ladner, Roy, et al., "Case-Based Classification Alternatives to Ontologies for Automated Web Service Discovery and Integration" proceedings of the SPIE—The International Society for Optical Engineering, Apr. 17, 2006, 8 pages.

Lapukhov, "Scaling MPLS networks," INE, Mar. 24, 2015, 15 pages; http://blog.ine.com/2010/08/16/scaling-mpls-networks/.

Lemmens, Rob, et al., "Semantic and Syntactic Service Descriptions at Work in Geo-service Chaining", 9th Agile International Conference on Geographic Information Science, Apr. 20, 2006, 11 pages.

Marques, P., et al., "Dissemination of Flow Specification Rules," Network Working Group, RFC 5575, Aug. 2009, 22 pages.

McKeown, et al., "OpenFiow: Enabling Innovation in Campus Networks," ACM SIGCOMM Computer Communication Review, vol. 38, No. 2, Apr. 2008, 6 pages.

PCT International Preliminary Report on Patentability (1 page) and Written Opinion of the International Searching Authority (4 pages) mailed May 13, 2009 for International Application No. PCT/US2008/050349.

PCT International Search Report mailed May 13, 2009 for International Application No. PCT/US2008/050349.

Quinn, P., et al., "Network Services Header," Network Working Group Internet Draft draft-quinn-sfc-nsh-07.txt, Feb. 24, 2015; 43 pages.

Raszuk, R., et al., "BGP vector Routing," Network Working Group, Oct. 27, 2014, 12 pages; https://tools.ietf.org/html/draft-patel-raszuk-bgp-vector-routing-04.

Rekhter, Y., et al., "A Border Gateway Protocol 4 (BGP-4)," Network Working Group, RFC 4271, Jan. 2006, 104 pages; https://tools.ietf.org/html/rfc4271.

Rosen, E., et al., "BGP/MPLS IP Virtual Private Networks (VPNs)," Network Working Group, RFC 4364, Feb. 2006, 47 pages; https://tools.ietf.org/html/rfc4364.

Singh, Sumeet et al., Service Portability: Why HTTP redirect is the model for the future [on line], Nov. 2006 [retrieved on Sep. 8, 2009], retrieved from the Internet: URL:http://conferences.sigcomm.org/hotnets/2006/singh06service.pdf, 6 pages.

U.S. Appl. No. 14/684,363, filed Apr. 11, 2015, entitled "System and Method to Chain Distributed Applications in a Network Environment," Inventor(s): Hendrikus G.P. Bosch, et al.

U.S. Appl. No. 14/717,887, filed May 20, 2015, entitled "System and Method to Facilitate the Assignment of Service Functions for Service Chains in a Network Environment," Inventor(s): Robert M. Batz, et al.

(56) References Cited

OTHER PUBLICATIONS

U.S. Appl. No. 14/728,010, filed Jun. 2, 2015, entitled "System and Method to Facilitate the Assignment of Service Functions for Service Chains in a Network Environment," Inventors: Robert M. Batz et al.
"ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.
"ATIS-I-0000046: Emerging Opportunities for Leveraging Network Intelligence," ATIS, Oct. 2014; 45 pages.
Balduini, M., et al., "Stream Reasoning for Linked Data," International Semantic Web Conference ISWC 2013, Sydney, Australia, Oct. 21-25, 2013 31 pages.
Bertsekas, Prof. Dimitri P., "Session 1813 Traffic Behavior and Queueing in a QoS Environment," Networking Tutorials, OPNetwork 2002, Washington, DC, Aug. 2002; 90 pages.
Bhatia, M., et al., "Bidirectional Forwarding Detection (BFD) on Link Aggregation Group (LAG) Interfaces," Internet Engineering Task Force RFC 7130, Feb. 2014; 11 pages.
Bierman, A., "Restconf Protocol," Network Working Group Internet-Draft, draft-ietf-netconf-restconf-10, Mar. 16, 2016; 116 pages.
Bitar, et al., "Interface to the Routing System (I2RS) for Service Chaining: Use Cases and Requirements," draft-bitar-i2rs-service-chaining-00.txt; Internet Engineering Task Force, IETF Standard Working Draft; Jul. 15, 2013; 30 pages.
"ETSI TS-123-401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ©European Telecommunication Standards Institute 2010; Jun. 2010, 261 pages.
"ETSI TS-129-212 V9.5.0 (Jan. 2011) Technical Specification: Universal Mobile Telecommunications System (UMTS); LTE; Policy and charging control over Gx reference point (3GPP TS 29.212 version 9.5.0 Release 9)," ©European Telecommunication Standards Institute 2011; Jan. 2011,120 pages.
ETSI TS 129 212 V13.4.0 (Jan. 2016) Technical Specification: Universal Mobile Telecommunications System (UMTS); LTE; Policy and Charging Control (PCC); Reference points (3GPP TS 29.212 version 13.4.0 Release 13), European Telecommunications Standards Institute (ETSI), 650 Route des Lucioles, F-06921 Sophia Antipolis Cedex—France, Jan. 2016; 249 pages.
"ETSI TS-136-401 V8.6.0 (Jul. 2009) Technical Specification: LTE; Evolved Universal Terrestrial Radio Access Network (E-UTRAN); Architecture description (EGPP TS 36.401 version 8.60 Release 8)," ©European Telecommunication Standards Institute 2009; Jul. 2009, 21 pages.
Bjorklund, M., et al., "YANG—A Data Modeling Language for the Network Configuration Protocol (NETCONF)," Internet Engineering Task Force RFC 6020, Oct. 2010; 173 pages.
Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.
Boucadair et al., "Differentiated Service Function Chaining Framework," Network Working Group Internet Draft draft-boucadair-network-function-chaining-03, Aug. 21, 2013.
Boucadair, M., et al., "Analysis of Potential Solutions for Revealing a Host Identifier (HOST_ID) in Shared Address Deployments," Internet Engineering Task Force RFC 6967, Jun. 2013; 24 pages.
Brockners, F., et al., "Data Formats for In-band OAM," Network Working Group Internet-Draft, draft-brockners-inband-oam-data-00, Jul. 8, 2016; 14 pages.
Brockners, F., et al., "Encapsulations for In-band OAM Data," Network Working Group Internet-Draft, draft-brockners-inband-oam-transport-00, Jul. 8, 2016; 14 pages.

Brockners, F., et al., "Proof of Transit," Network Working Group Internet-Draft, draft-brockners-proof-of-transit-00, Jul. 8, 2016; 19 pages.
Brockners, F., et al., "Requirements for In-band OAM," Network Working Group Internet-Draft, draft-brockners-inband-oam-requirements-oo, Jul. 8, 2016; 18 pages.
Brockners, Frank, et al., "Containers on Routers and Switches: Run your apps and tools natively on Cisco boxes," Cisco LIVE! Berlin, Germany, Feb. 15-19, 2016; 113 pages.
Brockners, Frank, et al., "Next-gen Network Telemetry: Trip-recording and Service Chain/Path Verification for all Traffic," Cisco LIVE! Berlin, Germany, Feb. 15-19, 2016; 88 pages.
Browne, R., et al., "Network Service Header Timestamping," Network Working Group Internet Draft, draft-browne-sfc-nsh-timestamp-00.txt, Dec. 4, 2015; 19 pages.
Cao, Z., "Data Plane Processing Acceleration Framework," Internet Engineering Task Force Internet Draft, draft-cao-dataplane-acceleration-framework-o1, Jul. 4, 2014; 10 pages.
Carmes, "Delivering Data Plane Acceleratin for ETSI's NFV PoC," SDxC Central, Jan. 16, 2014; 8 pages.
"CEA-708," from Wikipedia, the free encyclopedia, Nov. 15, 2012; 16 pages.
Chaloupka, Jiri, "NFV Pro Poskytovatele Sluzeb," Tech SP2, Cisco Connect, Praha, Ceska republika; Mar. 24-25, 2015; 114 pages.
"Cisco Nexus 1000V Series Switches," Cisco Systems, Inc., Jul. 2013; 3 pages.
Cisco Systems, Inc., "Cisco IOS Flexible NetFlow Technology," Data Sheet, Dec. 2008; 5 pages.
Cisco Systems, Inc., "Chapter 11: Virtual Routing and Forwarding," Cisco Active Network Abstraction 3.7 Reference Guide, Feb. 1, 2010, 7 pages.
Cisco Systems, Inc., Vmware, Inc., "Joint Cisco and Vmware Solution for Optimizing Virtual Desktop Delivery," Sep. 2008.
"Cisco vPath and vServices Overview," Chapter 1, Cisco vPath and vServices Reference Guide, OL-27702-02, Oct. 19, 2012; 10 pages.
Claise, B., et al., "Specification of the IP Flow Information Export (IPFIX) Protocol for the Exchange of Flow Information," Internet Engineering Task Force RFC 7011; Sep. 2013; 76 pages.
Clark, Joe, "Playing with your Traffic: Exploring the Software-Defined Packet Control Within the IETF," Cisco LIVE! Berlin, Germany, Feb. 15-19, 2016; 91 pages.
Desaunay, Laurent, "Operation & Management Transition with the Adoption of an SDN Architecture and NFV Concepts," Cisco LIVE! Berlin, Germany, Feb. 15-19, 2016; 43 pages.
"Digital Program Insertion," from Wikipedia, the free encyclopedia, Jan. 2, 2012; 1 page.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
"Dynamic Adaptive Streaming over HTTP," from Wikipedia, the free encyclopedia, Oct. 25, 2012; 3 pages.
EPO Oct. 6, 2015 Extended Search Report and Written Opinion from European Application Serial No. 15160159.8.
"ETSI GS NFV 002 V1.2.1 (Dec. 2014) Group Specification: Network Functions Virtualisation (NFV); Architectural Framework," ETSI, 650 Route des Lucioles, F-06921 Sophia Antipols Cedex-France; Dec. 2014; 21 pages.
"ETSI GS NFV-REL 004 V1.1.1 (Apr. 2016) Group Specification: Network Functions Virtualisation (NFV); Assurance; Report on Active Monitoring and Failure Detection," ETSI, 650 Route des Lucioles, F-06921 Sophia Antipols Cedex-France; Apr. 2016; 61 pages.
Fang et al., "BGP IP BPN Virtual PE; draft-fang-13vpn-virtual-pe-02," Internet Engineering Task Force, Apr. 7, 2013; 26 pages.
Fernando et al., "Virtual Topologies for Service Chaining in BGP IP VPNs; draft-rfernando-13vpn-service-chaining-01," Internet Engineering Task Force, Feb. 25, 2013; 16 pages.
Freier, et al., "The Secure Sockets Layer (SSL) Protocol Version 3.0," Internet Engineering Task Force (IETF), RFC 6101, Aug. 2011, 67 pages; http://tools.ietf.org/pdf/rfc6101.pdf.
Gray, et al., "Leases: An Efficient Fault-Tolerant Mechanism for Distributed File Cache Consistency," Proceedings of the Twelfth

(56) References Cited

OTHER PUBLICATIONS

ACM Ssymposium on Operating Systems Principles, New York, NY (Dec. 3-6, 1989), 9 pages; http://www.stanford.edu/class/cs240/readings/89-leases.pdf.

"G-Streamer and in-band Metadata," from RidgeRun Developer Connection, Jun. 19, 2012; 5 pages.

Guichard, J., et al., "Network Service Header (NSH) Context Header Allocation (Data Center)," Service Function Chaining Internet-Draft, draft-guichard-sfc-nsh-dc-allocation-04, Feb. 15, 2016; 8 pages.

Halpern et al., "Service Function Chaining (SFC) Architecture," RFC 7665, Oct. 2015.

Han, Bo, et al. "Network function virtualization: Challenges and opportunities for innovations." Communications Magazine, IEEE 53.2 (Feb. 2015): 90-97.

Higgins, Tim, "How We Test SPI+NAP Routers," SmallNetBuilder, Oct. 18, 2002; 5 pages.

"How do switches, vSwitches and distributed vSwitches differ? Getting Vmware terminology straight," TechTarget, Jun. 11, 2013; 4 pages.

"IEEE Standard for the Functional Architecture of Next Generation Service Overlay Networks, IEEE Std. 1903-2011," IEEE, Piscataway, NJ, Oct. 7, 2011; 147 pages.

"Interim report: Subscriber Aware SGi/Gi-LAN Virtualization," ConteXtream, ETSI, Jul. 24, 2014; 16 pages.

"ip infusion™, A Redundant Architecture for Routing Protocols," White Paper, Jun. 2002, XP002240009, 8 pages; www.ipinfusion.com/pdf/WP_Redundancy_rev0602.pdf.

"ISO/IEC JTC 1/SC 29, Information Technology—Dynamic Adaptive Streaming over HTTP (DASH)—Part 1: Media Presentation Description and Segment Formats," International ©ISO/IEC 2012—All Rights Reserved; Jan. 5, 2012; 131 pages.

Jeff Pang, Distributed Hash Tables< 2004, 33 pages; http://www.cs.cmu.edu/~dga/15-744/S07/lectures/16-dht.pdf.

Jiang, et al., "An Architecture of Service Function Chaining," IETF Network Working Group Internet Draft, draft-jiang-sfc-arch-01.txt, Feb. 14, 2014; 12 pages.

Katz, D., "Bidirectional Forwarding Detection (BFD)," Internet Engineering Task Force RFC 5880, Jun. 2010; 49 pages.

Kim, et al., "Floodless in SEATTLE: A Scalable Ethernet Architecture for Large Enterprises," Computer Communication Review, Oct. 2008, 14 pages; http://www.cs.princeton.edu/~chkim/Research/SEATTLE/seattle.pdf.

Kumar, S., et al., "Service Function Path Optimization: draft-kumar-sfc-sfp-optimization-00.txt," Internet Engineering Task Force, IETF; Standard Working Draft, May 10, 2014.

Lampson, "How to Build a Highly Available System Using Consensus," Proceedings of the 10th International Workshop on Distributed Algorithms (Oct. 1996), 17 pages; http://research.microsoft.com/en-us/um/people/blampson/58-Consensus/Acrobat.pdf.

Lawful interception, Wikipedia, the free encyclopedia, Nov. 17, 2015; 7 pages.

Lesniewski-Laas, et al., "SSL splitting: securely serving data from untrusted caches," Laboratory for Computer Science, Massachusetts Institute of Technology, First published on or about Aug. 30, 2008, 13 pages; http://pdos.csail.mit.edu/papers/ssl-splitting-usenixsecurity03.pdf.

Li, Hongyu, "Service Function Chaining Use," IETF 88 Vancouver, Nov. 7, 2013.

"Little's law," from Wikipedia, the free encyclopedia, Apr. 17, 2016; 5 pages.

"M/D/1 queue," from Wikipedia, the free encyclopedia, May 16, 2016; 6 pages.

Mackie, B., et al., "Service Function Chains Using Virtual Networking," draft-mackie-sfc-using-virtual-networking-o2.txt; Internet Engineering Task Force, IETF Standard Working Draft, Oct. 17, 2013; 44 pages.

"M-PEG 2 Transmission," ©Dr. Gorry Fairhurst, 9 pages [Published on or about Jan. 12, 2012] http://www.erg.abdn.ac.uk/future-net/digital-video/mpeg2-trans.html.

"MPEG Transport Stream," from Wikipedia, the free encyclopedia, Nov. 11, 2012; 7 pages.

Netmanias, "LTE QoS: SDF and EPS Bearer QoS," Netmanias: Analyze Trends, Technologies and Market, Sep. 11, 2013; 18 pages.

"NFV ISG PoC Proposal: SDN Enabled Virtual EPC Gateway," ETSI, NFV World Congress San Jose, May 5-7, 2015; 7 pages.

PCT Mar. 10, 2009 International Preliminary Report on Patentability from International Application No. PCT/IB05/01013, 5 pages.

PCT Jan. 2, 2013 International Search Report and Written Opinion of the International Searching Authority from International Application Serial No. PCT/US2012/048764; 14 pages.

PCT Nov. 10, 2014 International Search Report from International Application No. PCT/US2014/036907; 3 pages.

PCT Jun. 24, 2014 International Preliminary Report on Patentability from International Application No. PCT/US2012/048674; 8 pages.

PCT Jun. 26, 2014 International Preliminary Report on Patentability from International Application PCT/US2012/067502.

PCT Jan. 19, 2015 International Search Report and Written Opinion from International Application Serial No. PCT/US2014/062244.

PCT Mar. 16, 2015 International Search Report and Written Opinion from International Application No. PCT/US2014/066629.

PCT Aug. 20, 2015 International Search Report and Written Opinion of the International Searching Authority from International Application Serial No. PCT/U52015/020242; 12 pages.

PCT—Jun. 30, 2008 International Search Report and Written Opinion from International Application No. PCT/IB05/01013, 5 pages.

PCT—Apr. 4, 2013 International Search Report and Written Opinion from International Application No. PCT/US2012/067502 11 pages.

Quinn, et al., "Network Service Header," Network Working Group Internet Draft draft-quinn-nsh-01, Jul. 12, 2013.

Quinn, P., et al., "Network Service Header," Network Working Group Internet-Draft, draft-ietf-sfc-nsh-o4.txt, Mar. 21, 2016; 43 pages.

Quinn, P., et al., "Network Service Header," Network Working Group Internet-Draft draft-quinn-sfc-nsh-02.txt, Feb. 14, 2014, 21 pages.

Quinn, P., et al., "Network Service Header," Networking Working Group Internet Draft draft-quinn-nsh-00.txt, Jun. 13, 2013, 20 pages.

Quinn, et al., "Problem Statement for Service Function Chaining," RFC 7498, Apr. 2015.

Quinn, P., et al., "Service Function Chaining (SFC) Architecture," IETF Standard Working Draft draft-quinn-sfc-arch-05.txt; May 5, 2014, 31 pages.

"Realising the Benefits of Network Functions Virtualisation in Telecoms Networks," Intel Corporation, White Paper, First published on or about Apr. 20, 2015.

Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.

Rosen, E., et al., "MPLS Label Stack Encoding," Network Working Group RFC 3032, Jan. 2001; 23 pages.

Salaets, Bart, "Advanced Traffic Steering & Optimization Technologies," MENOG 2014, Mar. 30, 2015, XP055214882 http://www.menog.org/presentations/menog-14/272-Advanced_Traffic_Steering_v04.pdf.

Salisbury, Brent, "The Control Plane, Data Plane and Forwarding Plane in Networks," NetworkStatic: Brent Salisbury's Blog, Sep. 27, 2012; 6 pages.

Salsano, S., et al., "Generalized Virtual Networking: an enabler for Service Centric Networking and Network Function Virtualization", 16th International Telecommunications Network Strategy and Planning Symposium, Networks 2014, Sep. 17-19, 2014, Funchal, Portugal (pdf on arXiv) (slides: pptx pdf SlideShare) http://netgroup.uniroma2.it/people/faculties/stefano-salsano/stefano-salsano-publications-list/.

(56) References Cited

OTHER PUBLICATIONS

Snell, "HTTP/2.0 Discussion: Binary Optimized Header Encoding," Network Working Group, Internet Draft, Expires Aug. 22, 2013, Feb. 18, 2013, 8 pages; http://tools.ietf.org/pdf/draft-snell-httpbis-keynego-02.pdf.
"Tutorial on Stream Reasoning for Linked Data at ISWC 2013," International Semantic Web Conference 2013, Sydney, Australia, Oct. 2013.
"Verizon Network Infrastructure Planning: SDN-NFV Reference Architecture, Version 1.0," Verizon Wireless, Inc., Feb. 2016; 220 pages.
Virtamo, J., "Poisson process," 38.3143 Queueing Theory/Poisson process, first published on or about Apr. 23, 2006; 19 pages.
"Virtual Gi-LAN and EPC to Create and Deploy Services Faster," Intel Corporation, Solution Brief, Software-based Network Solutions; Copyright © 2015 Intel Corporation. All rights reserved; 6 pages.
"Virtual Solutions for your NFV Environment," F5 Networks Solution Center, first published on or about Feb. 2, 2016; 12 pages.
Vishwanath, Arun, et al., "How Poisson is TCP Traffic at Short Time-Scales in a Small Buffer Core Network?" ANTS'09 3rd international conference on Advanced Networks and Telecommunication Systems, New Delhi, India, Dec. 2009; 3 pages.
"What is the difference between the Data Link Layer and the Network Layer in the OSI Model?" Yahoo Answers; Dec. 14, 2008; 2 pages.
Williams, et al., et al., "Overlay Path Option for IP and TCP," Network Working Group, Internet Draft, Expires Dec. 21, 2013, Jun. 19, 2013, 17 pages; http://tools.ietf.org/pdf/draft-williams-overlaypath-ip-tcp-rfc 04.pdf.
Wolf, K.H., "VPP: Virtual Presence Protocol," Internet Draft, draft-wolf-vpp-01.txt, Jul. 5, 1999; 46 pages.
Wong, F., et al., "SMPTE-TT Embedded in ID3 for HTTP Live Streaming, draft-smpte-id3-http-live-streaming-00," Informational Internet Draft, Jun. 2012; 7 pages.
Wu, et al., "Resilient and efficient load balancing in distributed hash tables," Journal of Network and Computer Applications 32 (Jan. 2009), 16 pages; http://sist.sysu.edu.cn/~dwu/papers/jnca09-lb.pdf.
Yavatkar, R., et al., "A Framework for Policy-Based Admission Control," Network Working Group, RFC 2753, Jan. 2000; 21 pages.
Yourtchenko, et al., "Revealing hosts sharing an IP address using TCP option," Network Working Group, Internet Draft, Expires Jun. 10, 2012, Dec. 8, 2011, 10 pages; http://tools.ietf.org/pdf/draft-wing-nat-reveal-option-03.pdf.
Brown, Gabriel, "Designing 5G-Ready Mobile Core Networks," White Paper, Heavy Reading, Sep. 2016; 14 pages.
Sayeed, Akbar M., "Millimeter-Wave MIMO Architectures for 5G Gigabit Wireless," GLOBECOM Workshop on Emerging Technologies for 5G Wireless Cellular Networks, Dec. 8, 2014; 37 pages.
"Stream Control Transmission Protocol," from Wikipedia, the free encyclopedia, Oct. 11, 2016, 8 pages.
"LTE Quick Reference, IDs in LTE," ShareTechnote Handbook, first published on or about Jul. 13, 2012; 13 pages.
Ghodsi, Ali, et al., "Information-Centric Networking: Seeing the Forest for the Trees," Hotnets 2011, Nov. 14-15, 2011, Cambridge, MA; 6 pages.
"Information-centric networking," from Wikipedia, the free encyclopedia, Oct. 19, 2016; 2 pages.
"ETSI GS NFV-MAN 001 V1.1.1 (Dec. 2014) Group Specification: Network Functions Virtualisation (NFV); Management and Orchestration," ETSI, 650 Route des Lucioles, F-06921 Sophia Antipols Cedex-France, Dec. 2014; 184 pages.
4G Americas, "Executive Summary—Inside 3GPP Release 13: Understanding the Standards for HSPA+ and LTE-Advanced Enhancements," Sep. 2015, 9 pages.
"3GPP TS 23.008 V14.0.0 (Dec. 2016) Technical Specification: 3rd Generation Partnership Project; Technical Specification Group Core Network and Terminals; Organization of subscriber data (Release 14)," 3GPP, 650 Route des Lucioles—Sophia Antipolis Valbonne—France, Dec. 2016; 131 pages.
"3GPP Ts 23.122 V14.1.0 (Dec. 2016) Technical Specification: 3rd Generation Partnership Project; Technical Specification Group Core Network and Terminals; Non-Access-Stratum (NAS) functions related to Mobile Station (MS) in idle mode (Release 14)," 3GPP, 650 Route des Lucioles—Sophia Antipolis Valbonne—France, Dec. 2016; 50 pages.
"3GPP TS 23.236 V13.0.0 (Jun. 2015) Technical Specification: 3rd Generation Partnership Project; Technical Specification Group Services and System Aspects; Intra-domain connection of Radio Access Network (RAN) nodes to multiple Core Network (CN) nodes (Release 13)," 3GPP, 650 Route des Lucioles—Sophia Antipolis, Valbonne—France, Jun. 2015; 41 pages.
"3GPP TS 23.236 V14.0.0 (Sep. 2016) Technical Specification: 3rd Generation Partnership Project; Technical Specification Group Services and System Aspects; Intra-domain connection of Radio Access Network (RAN) nodes to multiple Core Network (CN) nodes (Release 14)," 3GPP, 650 Route des Lucioles—Sophia Antipolis, Valbonne—France, Sep. 2016; 41 pages.
"3GPP TS 23.401 V13.8.0 (Sep. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis, Valbonne—France, Sep. 2016; 374 pages.
"3GPP TR 23.711 V14.0.0 (Sep. 2016) Technical Report: 3rd Generation Partnership Project; Technical Specification Group Services and System Aspects; Enhancements of Dedicated Core networks selection mechanism (Release 14)," 3GPP, 650 Route des Lucioles—Sophia Antipolis, Valbonne—France, Sep. 2016; 36 pages.
"3GPP TR23.799 V0.2.0 (Feb. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Feb. 2016; 17 pages.
"3GPP TR 23.799 V0.3.0 (Mar. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Mar. 2016; 52 pages.
"3GPP TR 23.799 V0.4.0 (Apr. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Apr. 2016; 96 pages.
"3GPP TR 23.799 V0.5.0 (May 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, May 2016; 178 pages.
"3GPP TR 23.799 V0.6.0 (Jul. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Jul. 2016; 321 pages.
"3GPP TR 23.799 V0.7.0 (Aug. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Aug. 2016; 323 pages.
"3GPP TR 23.799 V0.8.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.1 (Sep. 2016) Technical Report: 3rd Generation Partnership Project; Technical Specification Group Services

(56) References Cited

OTHER PUBLICATIONS and System Aspects; Study on Architecture for Next Generation System (Release 14)," 3GPP, 650 Route des Lucioles—Sophia Antipolis, Valbonne—France, Sep. 2016; 423 pages.

"3GPP TR 23.799 V1.0.2 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.

"3GPP TR 23.799 V1.1.0 (Oct. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Oct. 2016; 501 pages.

"3GPP TR 23.924 V13.0.0 (Dec. 2015) Technical Report: 3rd Generation Partnership Project; Technical Specification Group Services and System Aspects; Feasibility study on Non-Access Stratum (NAS) node selection function above Base Station Controller (BSC)/Radio Network Controller (RNC) (Release 13)," 3GPP, 650 Route des Lucioles—Sophia Antipolis, Valbonne—France, Dec. 2015; 41 pages.

"3GPP TS 29.274 V14.2.0 (Dec. 2016) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 14)," 3GPP, 650 Route des Lucioles—Sophia Antipolis, Valbonne—France, Dec. 2016; 369 pages.

"3GPP TS 36.331 V13.3.0 (Sep. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Sep. 2016; 627 pages.

"3GPP TS 36.331 V14.1.0 (Dec. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Dec. 2016; 654 pages.

"3GPP TS 36.413 V14.1.0 (Jan. 2017) Technical Specification: 3rd Generation Partnership Project; Technical Specification Group Radio Access Network; Evolved Universal Terrestrial Radio Access Network (E-UTRAN); S1 Application Protocol (S1AP) (Release 14)," 3GPP, 650 Route des Lucioles—Sophia Antipolis, Valbonne—France, Jan. 2017; 333 pages.

"3GPP TR 38.801 V0.4.0 (Aug. 2016) Technical Report Technical Report: 3rd Generation Partnership Project; Technical Specification Group Radio Access Network; Study on New Radio Access Technology; Radio Access Architecture and Interfaces (Release 14)," 3GPP, 650 Route des Lucioles—Sophia Antipolis, Valbonne—France, Aug. 2016.

3GPP TSG-RAN WG3 Meeting #93bis, Document No. R3-162416, entitled "On Common and Specific Building Blocks for Inactive UEs," Source: Ericsson, Sophia Antipolis, France, Oct. 10-14, 2016; 7 pages.

SA WG2 Meeting #114, SA WG2 Temporary Document No. S2162010, entitled "NextGen Core Architecture solution for sharing Network Function across multiple Network Slices," Source: ZTE, Sophia Antipolis, Apr. 11-15, 2016; 8 pages.

\* cited by examiner

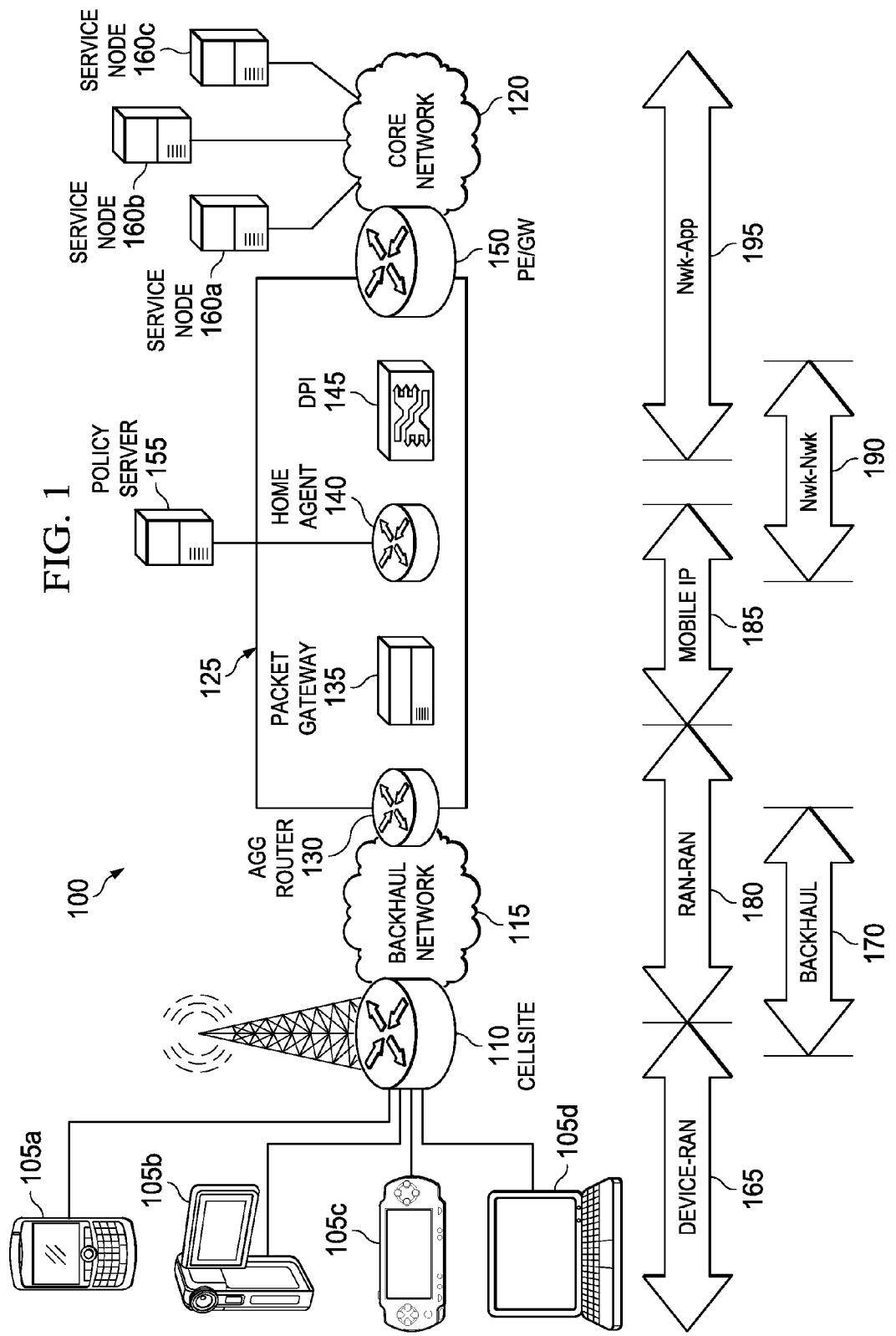

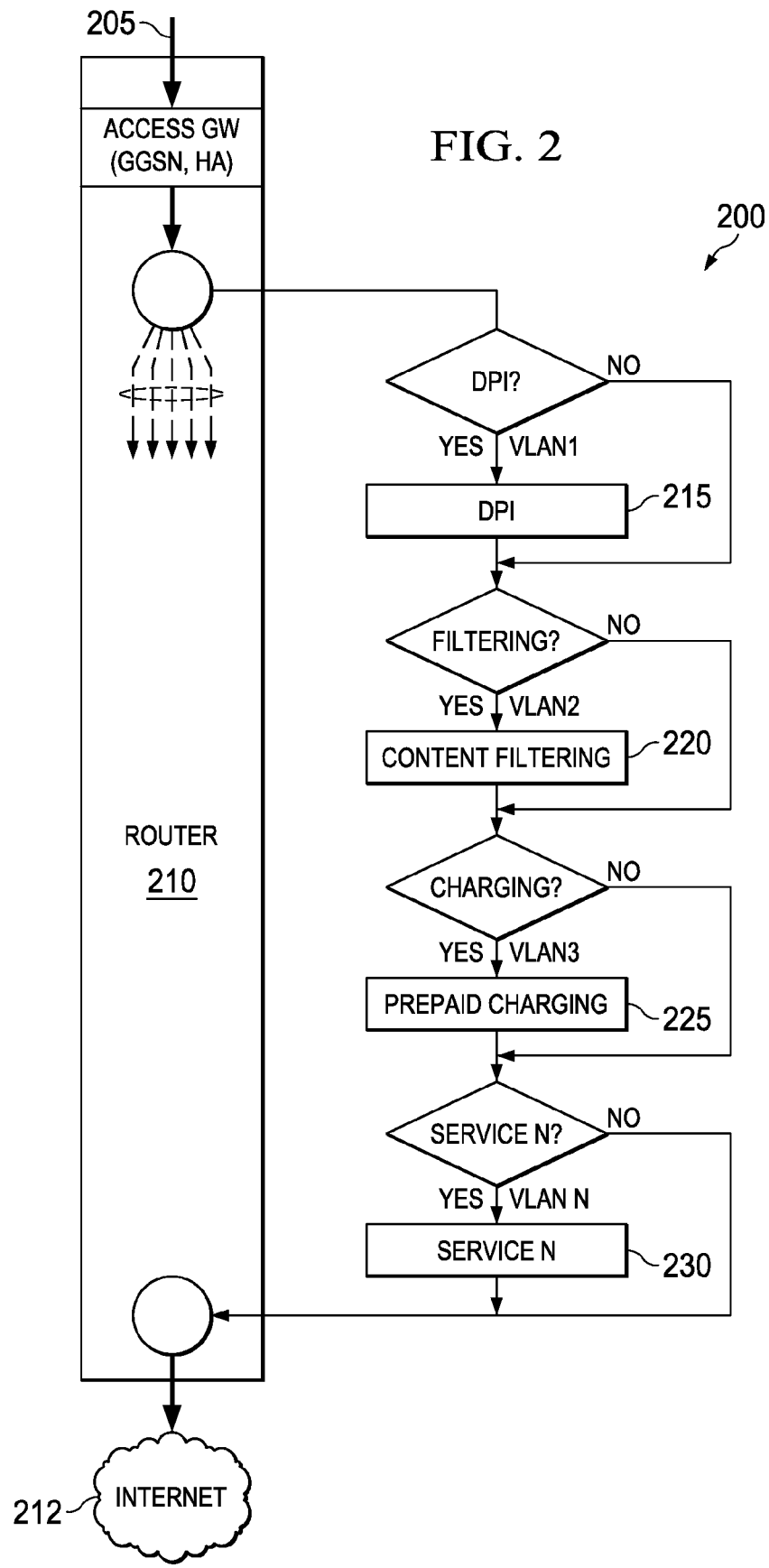

MOBILE SERVICE ROUTING IN A NETWORK ENVIRONMENT

RELATED APPLICATION

This application is a continuation (and claims the benefit of priority under 35 U.S.C. §120) of U.S. application Ser. No. 14/185,455, filed Feb. 20, 2014, entitled "MOBILE SERVICE ROUTING IN A NETWORK ENVIRONMENT," Inventors Muhammad A. Khan, et al., which is a continuation (and claims the benefit of priority under 35 U.S.C. §120) of U.S. application Ser. No. 13/100,130, filed May 3, 2011, entitled "MOBILE SERVICE ROUTING IN A NETWORK ENVIRONMENT," Inventors Muhammad A. Khan, et al., now issued as U.S. Pat. No. 8,743,885. The disclosures of the prior applications are considered part of (and are incorporated by reference in) the disclosure of this application.

TECHNICAL FIELD

This disclosure relates in general to the field of communications and, more particularly, to service routing in a mobile communications environment.

BACKGROUND

Networking architectures have grown increasingly complex in modern communication environments. As the subscriber base of end users increases and the services offered to those subscribers grows more complex, proper routing and efficient management of communication sessions and data flows becomes critical. Mobile networks exist providing mobile computing devices access to remote resources, including Internet-based resources. Further, mobile services exist that can be delivered over such networks including hardware security module service, firewall services, intrusion prevention services, intelligent messaging filter, content filtering, and other services. Mobile connectivity and services continue to grow in popularity and complexity, particularly as users rely more and more on accessing the Internet, web-based services and software, and other resources over a growing base of mobile devices, including smart phones and tablet computers armed with mobile internet access provided by various mobile network operators.

BRIEF DESCRIPTION OF THE DRAWINGS

FIG. 1 is a simplified block diagram of a mobile communications system.

FIG. 2 is a simplified block diagram of an example gateway system of a traditional communications systems used in connection with a plurality of services.

Like reference numbers and designations in the various drawings indicate like elements.

DETAILED DESCRIPTION OF EXAMPLE EMBODIMENTS

Overview

Figure 3A:
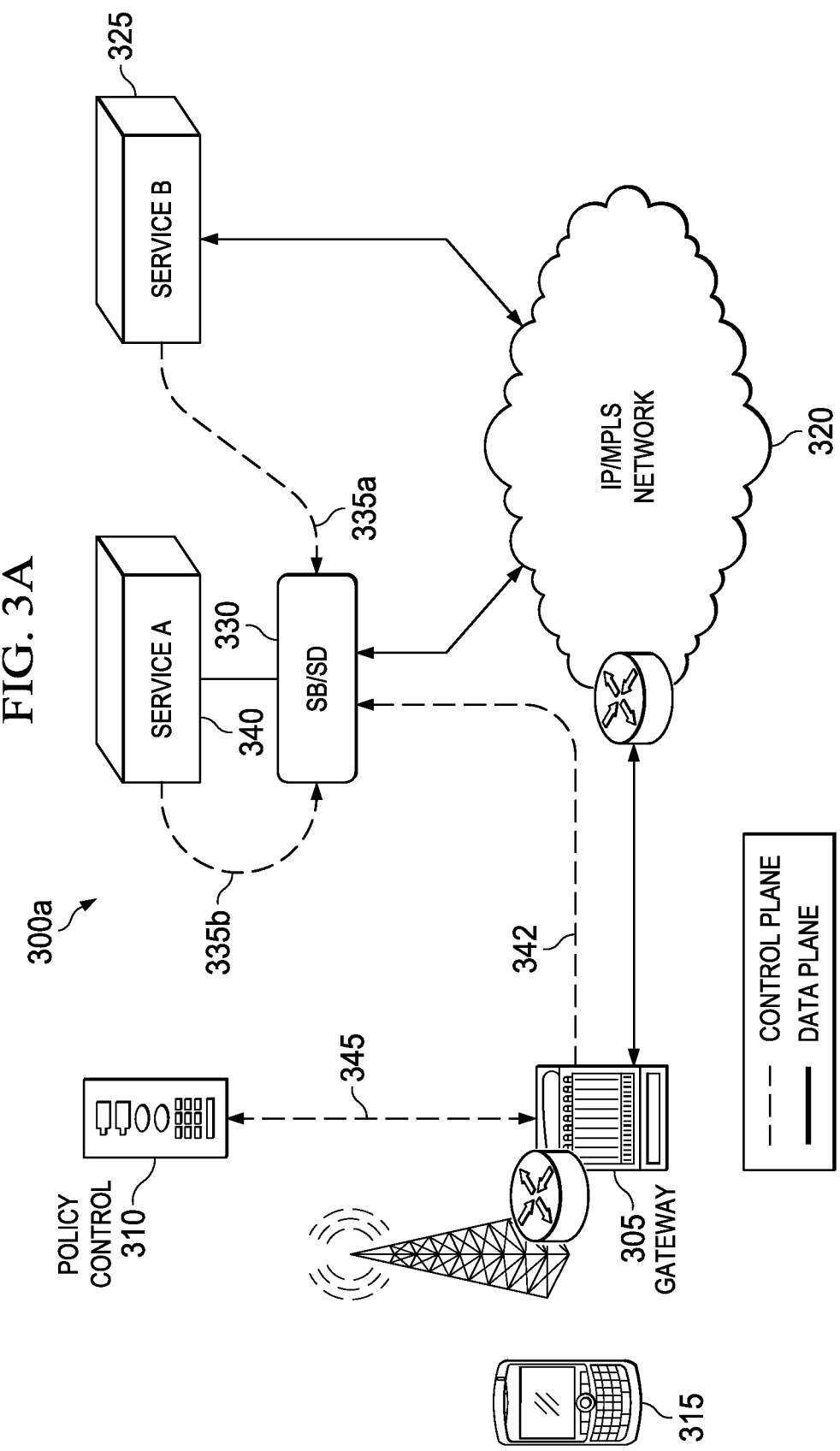
FIG. 3A is a simplified block diagram illustrating control plane interactions within a mobile communications system including a mobile gateway and policy control engine.

In general, one aspect of the subject matter described in this specification can be embodied in methods that include the actions of receiving a first data flow from a mobile network relating to a first mobile subscriber. First subscriber data can be received for the first mobile subscriber, the first subscriber data identifying at least one first service path corresponding to the first mobile subscriber and at least one first service policy corresponding to the first mobile subscriber, the at least one first service path including a first set of network service nodes in a plurality of network service nodes. Routing of at least one packet of the first data flow can be initiated over a network according to the first service path, the at least one packet corresponding to a request for at least one web-based resource. Initiating routing of the at least one packet can include appending the at least one packet with service header data identifying the at least one first service policy. Further, each service node in the plurality of network service nodes performs at least one service based at least in part on received request data, each service node in the first set of service nodes performs a service defined in a service subscription of the first mobile subscriber, and at least one particular service node in the first set of network service nodes performs a particular service based at least in part on the at least one first service policy.

These and other embodiments can each optionally include one or more of the following features. The first service path can be one of a plurality of predefined paths. Data can be received identifying a registration of a new service path for inclusion in the plurality of predefined paths, the new path including a new service provided using a particular service node. Path data can be stored for use in initiating routing of data through the new service path. Each path in the plurality of predefined paths can be adapted to route data to at least one service provided by a service node in the plurality of network service nodes. The service header data can further identify the at least one first service path name. The first path can specify an ordered routing of the at least one packet to each of the service nodes in the first set of service nodes. The first subscriber data can be received from a policy control engine, the policy control engine maintaining subscriber data for each of a plurality of mobile subscribers. The policy control engine can include at least one of AAA, HLR, or HSS data. At least one return packet can be received from at least one of the first set of network service nodes, the return packet corresponding the first data flow and including data, such as an appended tag, identifying a condition of a first service node in the first set of network service nodes. An aspect of the at least one first service path can be at least temporarily modified based at least in part on the identified condition of the first service node. Further, services provided by the first set of service nodes can include at least two of a firewall service, deep packet inspection (DPI) service, content filtering service, intrusion prevention service, intelligent message filtering service, VOIP service, ad insertion service, and online video service. The first subscriber data can include accounting date data corresponding to the service subscription of the first mobile subscriber. The service header data can further include the accounting date data and the particular service node can perform the particular service further based, at least in part, on the accounting date data.

Other features can include receiving a second data flow from the mobile network relating to a second mobile subscriber. Second subscriber data can be received for the second mobile subscriber, the second subscriber data identifying at least one second service path corresponding to the second mobile subscriber and at least one second service policy corresponding to the second mobile subscriber. Routing of at least one packet of the second data flow can be initiated, over the network, according to the second service path, the at least one packet of the second data flow corresponding to a request for at least one web-based resource. Initiating routing of the at least one packet of the second data flow can include appending the at least one packet of the second data flow with service header data identifying the at least one second service policy. Each service node in the second set of service nodes can perform a service defined in a service subscription of the second mobile subscriber, at least one particular service node in the second set of network service nodes performing a particular service based at least in part on the at least one second service policy, the second set of service nodes being different from the first set of service nodes.

Still other features can include receiving data identifying a change to the service subscription of the first mobile subscriber. A second data flow can be received from the mobile network relating to the first mobile subscriber. Modified subscriber data can be identified for the first mobile subscriber, the modified subscriber data including subscriber data different from the first subscriber data, based at least in part on the change. The at least one first policy can correspond to a particular service provided by at least one particular network service node in the first set of network service nodes, wherein the particular service is adapted to be performed in accordance with at least one of a plurality of particular policies, and the at least one first policy is one of the plurality of particular policies. A first IP-address-independent-identifier can be generated corresponding to the first mobile subscriber, where the service header data further includes the first IP-address-independent-identifier. An IP-address-independent-identifier can differentiate a first mobile subscriber from a second mobile subscriber sharing the same IP address.

Further, a policy control engine can maintain subscriber data for a plurality of mobile subscribers, the subscriber data for each mobile subscriber in the plurality of mobile subscribers including at least one particular service path name corresponding to a subscription of the corresponding mobile subscriber, the subscription for each mobile subscriber in the plurality of mobile subscribers including at least one service from a plurality of available services to which the corresponding mobile subscriber is subscribed. At least one particular service policy name can correspond to at least one of the services to which the corresponding mobile subscriber is subscribed. A routing module can receive the first subscriber data for the first mobile subscriber from the policy control engine. The policy control engine can also be configured to receive subscription modification requests relating to at least one mobile subscriber and modify subscriber data in accordance with the subscription modification request. A subscription modification request can identify a change to a particular service policy of a particular service subscribed to by a particular mobile subscriber in the plurality of mobile subscribers. A subscription modification request can also identify a change to the services to which a particular mobile subscriber is subscribed, and a corresponding service path corresponding to the particular mobile subscriber can be modified to reflect the change to the services to which the particular mobile subscriber is subscribed. A service policy name corresponding to the particular mobile subscriber can be modified to reflect the change to the particular service policy.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

The evolution and growth of the mobile Internet is fundamentally changing the way users access the Internet. End users are consuming content and services in new ways, across new devices (e.g., smartphone, netbooks, e-readers, and tablet computers), and interacting with other users in ways that only mobile networks can provide. These developments can be adapted to by transitioning existing mobile networks from transport-centric approaches, where the focus is on delivery of packets, to a service-centric approach, where intelligent end-to-end features deliver services efficiently, cost effectively, and with market differentiation. Accordingly, an improved mobile gateway can be provided that it is aware of not only the subscribers and services and policies to which subscribers are subscribed, but also the remote service resources themselves and the available paths to those services. Further, the mobile gateway can coordinate with other network elements and resources included in a service chain, exporting a portion of this awareness to these other resources while allowing the mobile gateway to be aware of the network location of where a service or application is, when to allow service access, and how to forward subscriber traffic to the relevant service or application in the most efficient manner. The mobile gateway can further extend awareness beyond those services hosted and managed by a particular, affiliated mobile service provider (such as the operator of the gateway) to other services, such as those provided through partnerships and others running "over the top." For instance, an improved mobile gateway can negotiate tags that can be appended to packets forwarded by the mobile gateway to other network resources allowing the network resources to receive and understand service- and subscriber-specific instructions and methods pertaining to the packet's data flow, as communicated by the mobile gateway through the tags. For instance, a service header can be appended to a dataflow payload identifying a particular service chain path and one or more service policies pertaining to services included in the service chain.

FIG. 1 is a simplified block diagram of an example embodiment of a communication system 100, which can be associated with a mobile wireless network. The example architecture of FIG. 1 includes multiple instances of user client devices 105a-d, each of which may connect wirelessly to one or more wireless access nodes (e.g., 110) to connect to backhaul links 115 (e.g., Ethernet backhaul) of communication system 100. The backhaul portion 115 of the network can include intermediate links between a local wireless edge network and routers and other network elements providing access to a core network 120, or backbone, of the network and the small subnetworks at the "edge" of a hierarchical network. One or more mobile gateway systems 125 can provide a point of presence to core network 120, allowing client devices 105a-d to consume one or more services provided by service node devices 160a-c connected to core network 120. Mobile gateway system 125 can include various network elements 130, 135, 140, 145, 150 for use in exchanging, analyzing, and modifying packets in a network environment. Further, one or more policy servers 155 can be in communication with mobile gateway system 125 to provide, for instance, data for use in authentication, authorization, and accounting (AAA) operations as well as provide subscriber-level intelligence regarding services and service policies associated with each subscriber in one or more particular mobile communication networks.

A mobile gateway system 125 can be connected to Ethernet backhaul 115 and a policy server 155 through one or more intermediate network elements such as aggregation router 130 or home agent router 140, respectively. A packet gateway 135, such as a packet data network gateway (PGW)/serving gateway (PGW/SGW) of an LTE network, can also be provided. In other instances, packet gateway can represent any anchor point in mobile or non-mobile networks, such as a broadband remote access server (BRAS) in a DLS network. Devices 145 and processing units adapted to perform deep packet inspection (DPI) operations can also be provided. An edge routing entity, such as a Provider Edge (PE) router 150 can also be provided to interface with core network 120 and route packets processed by mobile gateway system 125 through core network 120, for instance, to node service devices 160a-c. As further shown in FIG. 1, communication system 100 and portions of mobile gateway system 125 can be logically broken into various segments such as a device regional area network (RAN) 165, backhaul segment 170, RAN-RAN segment 180, mobile IP segment 185, a network-network segment 190, and network-to-application segment 195. A mobile client device 105a-d can access a core network 120 using communication system 100 to access core network 120, including the Internet, web-based resources, applications, and services, including services hosted by one or more service node devices 160a-c.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 100 may further include transmission control protocol/Internet protocol (TCP/IP) communications for the transmission or reception of packets in a network, and may also operate in conjunction with a user datagram protocol/IP (UDP/IP) or any other suitable protocol where appropriate and based on particular needs.

Communication system 100 may be tied to various architectures such as the 3rd Generation Partnership Project (3GPP) Evolved Packet System architecture as well as 3GPP access networks, such a GERAN, UTRAN, and E-UTRAN. In some implementations other architectures and access networks can be utilized such as digital subscriber line (DSL), Cable, WiMAX, code division multiple access (CDMA) 2000, WiFi, or the Internet.

User client devices 105a-d can be associated with clients, customers, or end users wishing to initiate a communication in system 100 via some network. In one particular example, user equipment 105a-d reflects individuals capable of generating wireless network traffic. The term "endpoint" is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, equipment, or object capable of initiating voice, audio, video, media, or data exchanges within communication system 100. User client devices 105a-d may also be inclusive of a suitable interface to the human user, such as a microphone, a display, or a keyboard or other terminal equipment. User client devices 105a-d may also be any device that seeks to initiate a communication on behalf of another entity or element, such as a program, a database, or any other component, device, element, or object capable of initiating an exchange within communication system 100. User client devices can may also include any device (such as a sensor or meter) used to capture an event (such as temperature), which is then relayed through the network to an application that translates the event into meaningful information. Data, as used herein in this document, refers to any type of numeric, voice, video, media, or script data, or any type of source or object code, or any other suitable information in any appropriate format that may be communicated from one point to another.

In certain example techniques of communication system 100, IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets. Unlike legacy network technologies (e.g., Integrated Service Digital Network (ISDN), Frame Relay, and Asynchronous Transfer Mode (ATM)) that define separate data and control channels, IP networks carry packets within a single pipe. Thus, IP network elements such as routers and switches can distinguish between data plane, control plane, and management plane packets, enabling each packet to be suitably processed. In general, the data plane (also known as the forwarding plane or the user plane) provides the ability to forward data packets; the control plane provides the ability to route data correctly; the management plane provides the ability to manage network elements.

Many packets handled by a router travel through the router via the data plane. Data plane packets can consist of end-station, user-generated packets that are forwarded by network devices to other end-station devices. Data plane packets may have a transit destination IP address, and they can be handled by normal, destination IP address-based forwarding processes. Service plane packets are a special case of data plane packets. Service plane packets can also be user-generated packets that may be forwarded by network elements to other end-station devices, but they may require high-touch handling by a network element (above and beyond normal, destination IP address-based forwarding) to properly forward the packet. Examples of high-touch handling include such functions as Generic Routing Encapsulation (GRE) encapsulation, quality of service (QoS), Multiprotocol Label Switching (MPLS), virtual private networks (VPNs), and secure socket layer (SSL)/IPsec encryption/decryption. In a mobile network, the data plane may be responsible for packet processing at a session/flow level, multiple flows/session per active user, access control list (ACL)/traffic flow template (TFT) filters per user/flow, tunneling, rate limiting, subscriber scalability, security, and Layer 7 (L7) inspection. These activities and services are typically intensive in terms of memory and packet processing.

Control plane packets can include packets that are generated by a network element (e.g., a router or a switch), as well as packets received by the network that may be used for the creation and operation of the network itself. Control plane packets may have a receive destination IP address.

Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information, such as service node devices 160*a-c*), managing high availability for a gateway, and configuring and managing the data plane. Packet overloads on a router's control plane can inhibit the routing processes and, as a result, degrade network service levels and user productivity, as well as deny specific users or groups of users' service entirely.

Typical mobile networks operate with two main control planes, one which dictates the subscriber and service policies, such as authentication, quality of service (QoS), charging, available services, etc., and another control plane which determines network and transport policies, including optimal routing, service reachability (at the IP layer), etc. The former of these control planes is typically specified in mobile working groups, including 3GPP, 3GPP2, and WiMAX Forum, leveraging existing control-plane protocols defined in IETF, such as RADIUS and DIAMETER. The latter of these control planes is typically fully-specified in IETF. Using a communication system 100, such as herein described, these two control planes can be at least partially integrated, via an improved mobile gateway, allowing the mobile gateway to function as a gatekeeper to the network resources (e.g., resources and services provided by service node devices 160*a-c*). Such an improved mobile gateway can be aware not only of the identify of an individual subscriber and the corresponding policies that are to be applied to the subscriber, but also aware of the location or source of the service or application on the network, when to allow service access, and how to forward subscriber traffic to the relevant service or application in the most efficient manner, as described in more detail below.

Modern applications can make use of a scalable L4-L7 service routing and insertion architecture. Such architectures can be configured to allow a service provider to integrate new services quickly into the network, and scale these services dynamically as demand accelerates. Additionally, service providers can then deploy services without significant changes to the underlying network layer. In mobile networks, such considerations are further complicated by the need to scale and chain these services dynamically on a per-subscriber. For instance, many nodes in a mobile network, such as billing entities, AAA servers, DPI engines, policy servers, mobile gateways, etc., store subscriber state information, and therefore receive bi-directional flows for the subscribers of which it is aware.

Traditional mobile communications systems can be limited in their ability to scale, for instance, as additional services are added and/or chained. In traditional mobile communications systems, substantial complexity results as operator attempt to scale the services, gateways, and network service entities independently, e.g., with load-balancing technologies. This complexity increases with the introduction of new network services and increasing scale for existing services. For example, as shown in FIG. 2, in an example communications system 200, a set of N services are made available for subscribers of a particular mobile network. Data 205 received over a mobile gateway router 210 and destined for a core network 212 (including access to the Internet) can be processed using one or more of the N services based on the subscription profile of the subscriber. For instance, a combination of any one of a DPI service 215, content filtering service 220, prepaid charging service 225, and other services (e.g., Service N 230) can be offered and chained together for particular subscribers. Further, different subscribers can be subscribed to different services and service combinations ("paths" or "chains"). For examples, a first subscriber can be subscribed to a DPI service 215 and content filtering service 220 while a second subscriber is subscribed to a DPI service 215 and prepaid charging service 225. In some instances, services can be provided by a plurality of distinct remote service nodes, indeed, in some cases, each service can be provided by a distinct service node. As illustrated in FIG. 2, using traditional mobile communications systems, multiple possible logical flows can result from offering multiple different services. Indeed, the number of possible logical flows scales exponentially with the addition of each additional service (where the number of logical flows equals NI, N being the number of available services). Further, in some implementations, each service can be associated with a corresponding virtual local area network (VLAN), introducing additional complexity. Indeed, in some instances, a service chain including multiple services can involve multiple VLANs. Still further, in traditional communications systems, multiple policy-based routing systems can be involved where a service chain includes multiple different services, with traffic steered to the corresponding service nodes based on IP address.

Further complicating subscriber-level management of services in a mobile communications environment are that certain services may need to be delivered in a particular order, relative to other services in a service chain. Further, the delivery of services and order of service delivery may need to be optimized, for instance, so as to route data according to a most efficient network path, based on the respective locations, interfaces, bandwidth, etc. of service nodes providing the services, as well as, the capabilities and features of the network elements acting as a gatekeeper for the routing and provision of services on behalf of mobile subscribers. Moreover, unlike in traditional networks, mobile networks can require a level of subscriber-level customization and tracking in connection with routing and switching decisions within the network. Additionally, many services can be delivered according to one of a plurality of policies available at the respective service, based in part on the identity of the particular subscriber consuming the service. As an example, a VOIP service can offer optional add-on services, billing plans, etc. to which a mobile subscriber may be subscribed.

In accordance with one example implementation, an intelligent mobile gateway can be implemented that provides an intersection between mobility events, routing topology, and service delivery, performing a gatekeeper function for the network. The mobile gateway can retrieve information on all services available on the core network, as well as the location of those services (e.g., an IP address for L3 adjacent, MAC address for L2 adjacent, etc.). As the service architecture and service availability changes, the gateway can be alerted to modify subsequent interactions with and routings of packets to service nodes corresponding to the services. Further, the intelligent mobile gateway can also be provided with subscriber information including subscriber policies for services to which the subscriber is subscribed and negotiate communication of such subscriber-specific data with the service nodes via control plane messages. The mobile gateway can tag packets destined for service nodes over the data plane with such subscriber information to assist in streamlining data flows and service delivery at least partially customized according to the mobile subscriber identity. In some implementation, such tags can also include next-service information, so that the service knows how to forward the packet next. The tag can also include specific processing priority, so that the service, if un-inundated, can choose to either process the packet and perform service, or transparently pass the packet, etc.

Packets tagged and sent out by the mobile gateway for processing by one or more service nodes in a service chain can return packets embodying the results of the services or reporting the status of the service to the mobile gateway. Such return packets can also be returned to a subscriber communication device via the mobile gateway. Return packets received from service nodes in response to the performance of one or more services can also be tagged with information describing service ability (e.g., CPU, memory, etc.), service status, service node status, and/or other service-related feedback information. Indeed, in some instances, return packet tags can include information describing an error, overload condition (e.g., too many concurrent subscribers or service instances), or other unavailability of a service or service node in the chain. For instance, in one example, a first service node after performing a corresponding service may attempt to forward the data flow to a second service node in the chain, only to discover that the second service node is either temporarily or permanently unavailable. The first service node, in returning the results of its service to the mobile gateway, can append its return packets with tags communicating the unavailability of the second service node. In such examples, where return packets include tags identifying status, modifications, and other conditions of service nodes downstream in the service chain, such return tags can be used by the mobile gateway to temporarily or permanently disable one or more services based on the intelligence communicated via the tags. In other examples, the mobile gateway can use such tags to modify, either temporarily or permanently, the corresponding service path, to mitigate the downstream service node unavailability. Additionally, the mobile gateway can coordinate with one or more policy servers or policy control managers (such as described in more detail below) to memorialize or otherwise manage corresponding changes to the service chain.

Figure 3B:
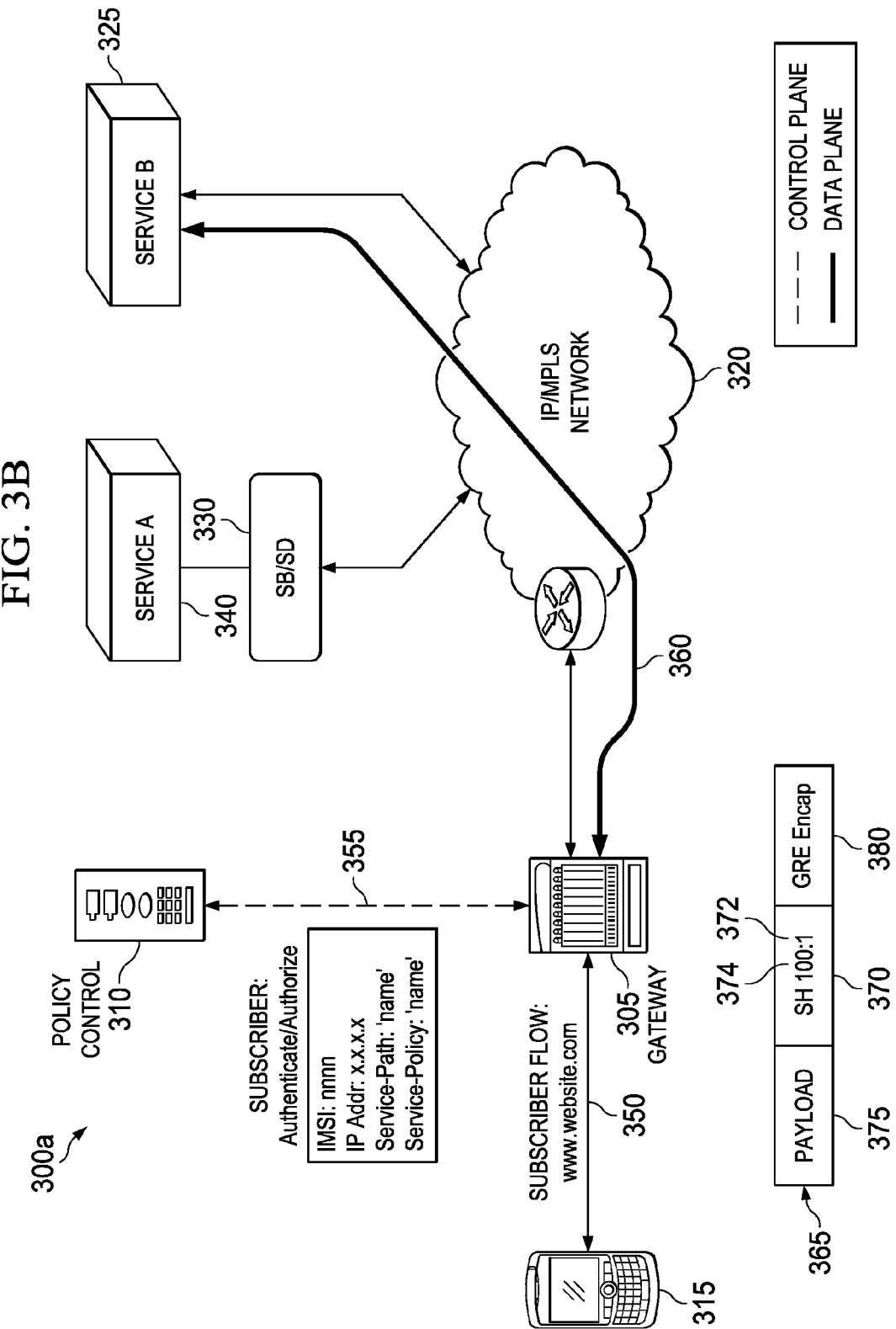
FIG. 3B is a simplified block diagram illustrating data plane interactions within a mobile communications system including a mobile gateway and policy control engine.

Turning to FIGS. 3A-3B, simplified block diagram 300a-b are shown illustrating one possible set of details associated with mobile communication systems, such as mobile communication system 100 illustrated in FIG. 1. In this particular example, a mobile gateway 305 can be provided in communication with a policy control engine 310. The mobile gateway can include at least one processor device and at least one machine-readable memory element. The policy control engine 310 can similarly include at least one processor device and at least one machine-readable memory element. In some instances, mobile gateway 305 and policy control engine 310 can be share one or more processors and/or memory elements. The policy control engine 310 can provide centralized policy control functionality for a plurality of mobile gateways (e.g., corresponding gateways of a single or multiple wireless service providers) or can be integrated with the mobile gateway 305 itself. The mobile gateway 305 can assist in providing a mobile client device 315 with access to a core network 320, such as an MPLS/IP backbone network. The mobile gateway 305 can further act as a gatekeeper for packets destined for or returned from one or more service nodes 325 in response to data transmitted to the gateway 305 from a mobile client device 315 via a wireless network. Service nodes 325 can provide a wide-variety of services that can be dynamically added and supplemented. Services can include, for examples, a hardware security module service, firewall services, intrusion prevention services, intelligent messaging filter, various web-based applications and services, voice-over-IP services, web video services, among other examples.

FIG. 3A illustrates certain control and management plane communications between mobile gateway 305, policy control engine 310, service broker/service directory (SB/SD) module 330 to establish service and subscriber awareness within the IP network (i.e., 320) infrastructure. Each service node (e.g., 325, 340) can register 335a-b with the SB/SD module 330 communicating information describing the service node including what services are provided by the service node, the network location of the service node, an identification of the entity maintaining or managing the service node, etc. In instances where a service provided by a particular service node (e.g., 325) includes multiple service policies effecting how the service is delivered and/or consumed, service policy information can also be shared with the SB/SD module 330. Information retrieved 335a-b from the service nodes 325, 340 by the SB/SD module 330 can be stored and maintained in one or more data structures, such as databases maintained by the SB/SD module 330. SB/SD module 330 can provision or be provisioned with a data plane service path for each service registered at the SB/SD module 330. Further, the SB/SD module 330 can be provisioned with at least one service template describing a listing of services that can be applied in the data plane of network 325.

The mobile gateway 305 and/or policy control engine 310 can also communicate with SB/SD module 330 in connection with the identification of service path (or service chain) data plane information corresponding to services registered at the SB/SD module 330. SB/SD module 330 can share this data with the mobile gateway 305 and/or policy control engine 310. In some examples, mobile gateway 305 can communicate with the SB/SD module 330 and share the knowledge obtained from the SB/SD module 330 with policy control engine 310. Indeed, in one particular example, mobile gateway 305 can register with SB/SD module 330, for instance, in order to be able to determine which services are available in the network. The mobile gateway 305 can identify one or more services available to subscribers of a mobile service making use of mobile gateway 305 and communicate 342 with SB/SD module to obtain up-to-date service path data corresponding to that service. Upon retrieving this information, in one particular example, the mobile gateway 305 can communicate 345 this information to policy control engine 310. In this way, mobile gateway 305, policy control engine 310 and SB/SD module 330 can maintain consistent records of the data plane service path and policies corresponding to each service registered at the SB/SD module 330 and relevant to the mobile gateway 305 (and policy control engine 310). Further, shorthand codes, names, or other identifiers can be assigned to each service path and service policy and consistently maintained across mobile gateway 305, policy control engine 310, and SB/SD module 330 to assist in communicating and using this information in routing and handling of mobile service requests.

Further, in some implementations, the provision of the SB/SD module 330 can also allow edge routers in the network to intelligently utilize or route data to particular mobile gateways registered with the SB/SD module 330. A plurality of mobile gateways can be provided and made available as a service in the chain as viewed from the perspective an edge router. Return service paths, policies, identifiers, and other data can be maintained for mobile gateways registered through the SB/SD module. Such data can be used by other edge nodes and routers on the network, including service nodes (e.g., 325). Allowing edge routers to also utilize intelligence maintained in an SB/SD module to intelligently specify a (e.g., return) service chain can, thereby further improve overall routing within a particular service-centric network environment.

Turning to FIG. 3B, certain example data plane communications are illustrated, for instance, involving a Service B provided by service node 325. A data flow 350 can be received originating from a subscriber's mobile client device 315 requesting web resources (such as a web page from www.website.com) accessible over core network 320. In connection with or in advance of this data flow 350, mobile client device 315 can be authorized and/or authenticated using a policy control engine 310. Policy control engine 310 can be implemented, at least in part, as an AAA server, home location register (HLR), policy charging and rules function (PCRF), or other module, function, or system adapted to maintain details of each mobile device subscriber authorized to use the network. Further, policy control engine can, in some implementations, assign an IP address to the subscriber device 315. In some instances, an IP address assigned to a particular subscriber device (e.g., 315) can be a temporary IP address, one that is re-used across a plurality of subscriber devices authorized to use the network. Further, policy control data maintained for individual subscribers can include and be indexed by a subscriber international mobile subscriber identity (IMSI) assigned to the subscriber. In connection with the authorization and authentication of the mobile device 315, policy control data 355 can be retrieved by the policy control engine 310 corresponding to the particular subscriber and forwarded to the mobile gateway 305. In some implementations, policy control data 355 can be forwarded to the mobile gateway 305 in response to a request from mobile gateway 305 for such information, in connection with a dataflow identified as originating from a corresponding subscriber device.

Policy control data 355 can include, in some instances, an identification of the subscriber (e.g., the subscriber IMSI), an assigned IP address for the corresponding subscriber device, together with a service path name corresponding to the subscriber, and one or more service policy identifiers corresponding to the subscriber and related to one or more of the services included in the subscriber's particular service path. As different subscribers can be subscribed to different services, a particular service path can be associated with a particular subscriber's account based on the set of services to which the subscriber is subscribed. In some implementations, a plurality of different service paths can be identified and maintained that correspond to a particular subscriber. For instance, in some examples, the service path (and relevant service policies) can be based on the type of dataflow or service request received from the subscriber device. Further, information returned in policy control data 355 identifying particular policies associated with or subscribed to by a subscriber can be delivered.

The mobile gateway 305 can use the received policy control data 355 to route packets to service nodes corresponding to or included in the service path identified in the policy control data 355. Indeed, the mobile gateway can append, tag, or otherwise include some or all of the received policy control data 355 in data flow 350 packets forwarded 360 to core network 320 over the data plane. For instance, a packet 365, including payload 375, can be tagged with a service header 370 that includes a service path identifier 372 and service policy identifier 374. Other data 380 can also be appended to the payload 375, such as a key used to distinguish between distinct subscriber devices that have each been assigned the same, shared IP address. Such key data, included in other data 380, can be appended to each packet in a particular data flow (e.g., where non-stateful, non-intelligent service nodes are involved in the service chain), or alternatively to only some (e.g., the first or last) packets in the flow (e.g., where all service nodes in a service chain are intelligent/stateful).

Using the identified service path included in one or more packets of data flow 360, network elements downstream from mobile gateway 305, including service nodes included in the service chain, can identify how the packets are to be forwarded (or "hop") through core network 320 on to subsequent service nodes in the service chain specified by the service path name. Neither the individual service nodes nor the locations of said nodes included in the service chain need be explicitly identified in the service path. Instead, in some implementations, a service path name (e.g., 372) can be provided that corresponds to a particular pre-defined combination and/or order of services to be accessed, called, consumed, etc. in connection with particular data flows of a given subscriber. Accordingly, a service path can be one of a plurality of pre-defined paths over service nodes in the network 320.

Further, one or more service policy names (e.g., 374) can be included in data flow 350 packets for use by service nodes (e.g., 325) receiving the packets of data flow 350. A particular service policy name can be pre-defined for a particular policy of a particular service provided by a particular service node. The service policy name can be the same policy name shared with the SB/SD module during registration of the service by the corresponding service node. The service node 325, upon receiving the packets of data flow 350, can inspect the packets and identify the service policy name corresponding to the service(s) provided by the service node 325. The service node can then tailor the service, utilizing the received packets 350, according to the policy defined in the service policy name included in the packets.

Figure 4A:
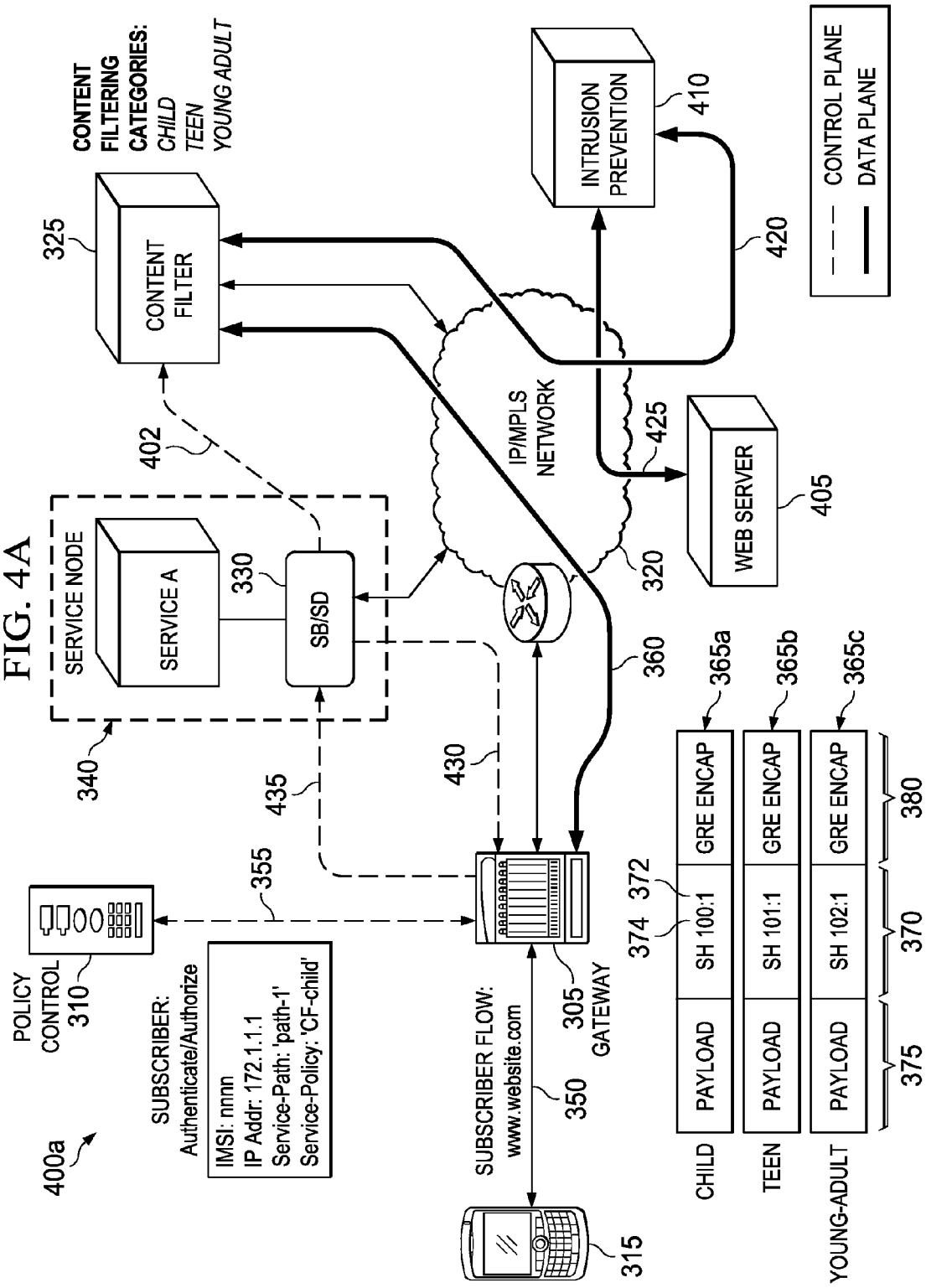
FIGS. 4A-4B are simplified block diagrams illustrating example functions of an example mobile communications system including a mobile gateway and policy control engine.
Figure 4B:
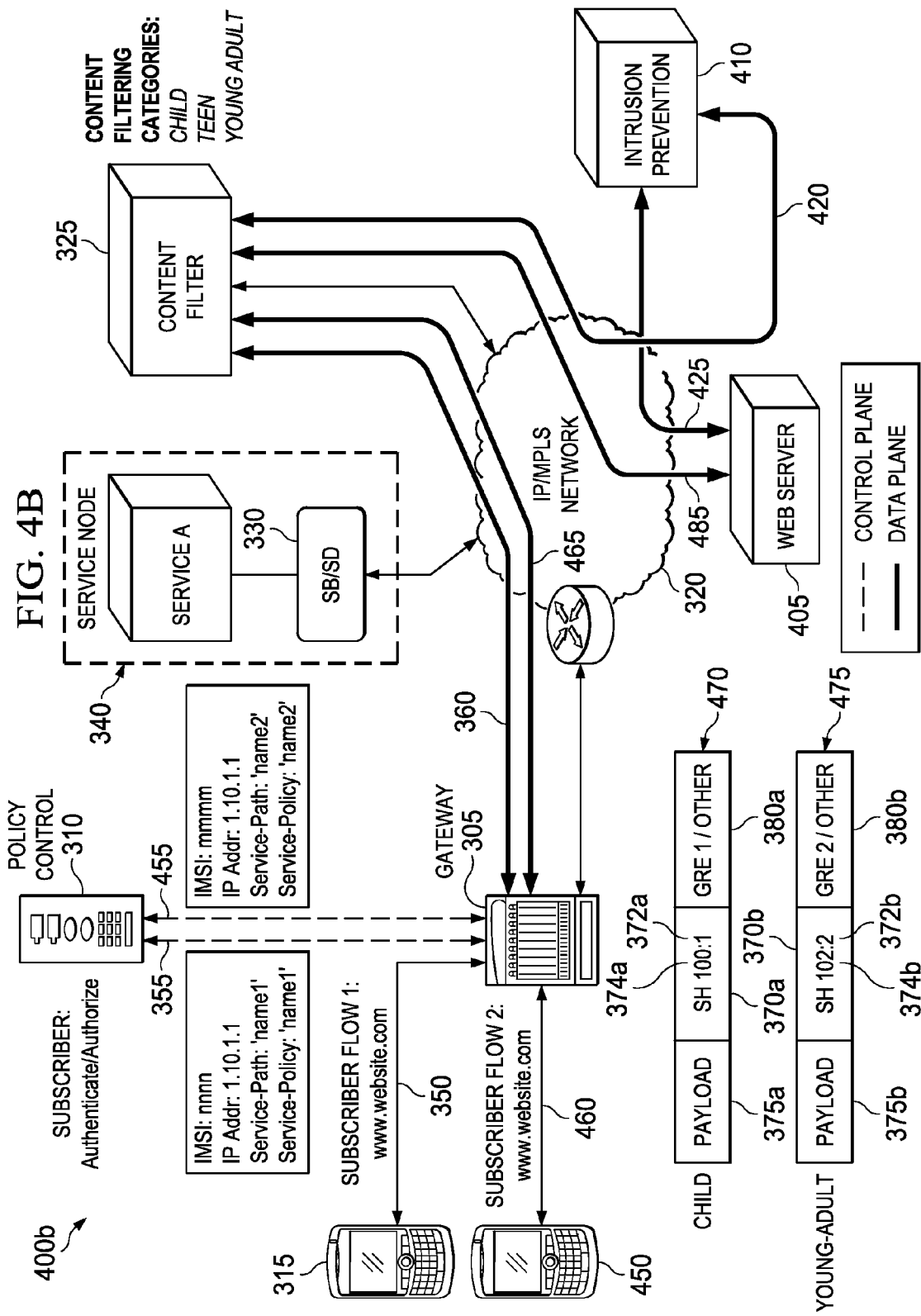

Turning to FIG. 4A-4B, simplified block diagrams 400a-b are shown illustrating some potential operations associated with the present disclosure. In the implementation of FIG. 4A, and by way of illustrating certain principles described above, a new service, for example, a content filtering service provided by service node 325, registers 402 with SB/SD module 330 allowing SB/SD module 330 to add the content filtering service to its services template, catalog policies of the service, and establish one or more service paths including or corresponding to the content filtering service. Existing services can also be modified, the respective service nodes hosting the service, sending update data to the SB/SD module 330 to communicate the change (such as a change to the location of the service node or a change in the policies of the service) to other network elements, such as mobile gateway 305. The SB/SD module 330 can share 430 this information with mobile gateway 305 in response to a request 435 from the mobile gateway 305. Mobile gateway 305 can further forward all or a portion of this information to policy control engine 310, including names (or other identifiers) corresponding to the service path(s) and service policies involving the newly added content filtering service of service node 325. Accordingly, records of service paths and policies maintained by policy control engine can be correspondingly updated to reflect the addition of the new content filtering service or modification of an existing service.

Building upon the illustrative example of FIG. 3A, FIG. 4A shows that subscriber data flow 350 can be received by mobile gateway 305 from a mobile device 315 associated with a particular subscriber. The data flow 350 can identify a request for one or more resources associated with a website hosted by a particular web server (e.g., 405). Mobile gateway 305 can obtain policy control data 355 retrieved by policy control engine 310 in connection with authentication and authorization of the subscriber client device 315. The policy control data 355 can include an identification of a particular service path associated with the subscriber as well as policies to which a subscriber has opted-in to. In this example, the retrieved service path identifier, "Path 1," retrieved for the subscriber in policy control data 355, corresponds to a subscriber's subscription to the content filtering service (hosted by service node 325) and an intrusion prevention service hosted by a service node 410. It can be determined that the data flow 350 from the subscriber device 315 should be processed according to the content filtering and intrusion prevention services subscribed to by the subscriber. Accordingly, mobile gateway 305 can append data to one or more packets in the data flow 350 forwarded onto the network 320, the data (e.g., 372) identifying the particular service path mapped to "Path 1." The mobile gateway 305 can, with the assistance of other network elements in network 120 and service nodes 325, 340, 410 route packets in data flow 350 according to the predefined data plane service path corresponding to "Path 1" as negotiated between service node 325, SB/SD module 330, mobile gateway 305, and other relevant network elements.

Further data (e.g., 374) can be appended to one or more packets in the data flow 350 forwarded onto the network 320 that identifies policies of one or more of the content filtering and intrusion prevention services associated with the subscriber. For instance, the content filtering service can have three categories (or policies) corresponding to varying levels of content filtering that can be provided using the content filtering service: one category for content filtering for children, one for teenagers, and one for young adults. The category of content filtering subscribed to by the subscriber can be identified in the data 374 included in service header 370 appended to a packet 365 of the data flow 350. For instance, as shown in FIG. 4A, depending on the subscriber's policy (i.e., child, teen, or young adult), a different service header 370 value can be appended to the payload 375 of the packet 365a-c forwarded on to the core network 320, thereby identifying to the service node (i.e., 325) the service policy associated with the packet.

When service node 325, hosting the content filtering service, receives packets tagged with service headers indicating that the packets are to be processed using content filtering service, the service node can identify policy name tags included in the service header data 370 appended to the packet payload 375. For instance, in one example, a packet 365a is received by service node 325. The service header 370 of packet 365a is parsed by the service node 325 to identify policy identifier 374 "100." The service node 325 can further identify that policy identifier "100" corresponds to child-level content filtering. Accordingly, service node 325 can perform child-level content filtering on the received packet as well as other packets in the data flow.

For some services, subscribers can specify, subscribe to, or opt-in to various policies or service levels associated with the service. Services can be delivered based on the subscribed-to policy. Among other advantages, the above system can simplify management of subscribers' policy changes. For instance, a user can request that a service level or policy for a particular service be modified. Such a request can be nearly instantaneously communicated to the mobile gateway 305 and/or policy control engine 310 so that subsequent data flows, originating from a subscriber device, are tagged with policy identifiers (e.g., 374) corresponding to the modified policy selection. For instance, continuing with the example of FIG. 4A, a subscriber can elect to change their content filtering policy from child to young-adult. After updating the data records of policy control engine 310, subsequent data flows involving the content-filtering service can be tagged with policy identifiers (e.g., equal to "102") corresponding to the young-adult-level content filtering, such as shown in packet 365c.

In some cases, as in the example of FIG. 4A, a service path can include services provided by multiple service nodes (e.g., 325, 410). Indeed, service policy identifiers included in service header 370 can be used to identify multiple policies, such as the policy of each distinct service in the service chain. In some cases, multiple different service policy identifiers (e.g., 374) can be included in the service header 370 each corresponding to a separate policy, while in other instances a single service policy identifier for the subscriber can map to a plurality of service policies subscribed to by a single subscriber, each policy corresponding to a separate service. Accordingly, a mobile gateway 305 can be used to assist in providing efficient routing and customization of data flows and mobile services based on the identity of the individual subscriber.

Turning to FIG. 4B, another simplified block diagram 400b is shown illustrating some other potential operations associated with the present disclosure. In some instances, an IP address can be assigned to a mobile subscriber in connection with the delivery of network (e.g., IP) services to a mobile device (e.g., 315, 450) associated with the mobile subscriber. In some instances, the IP address assigned to a mobile subscriber, such as in connection with authorization and authentication of the mobile subscriber (e.g., at 355, 455), can also be appended to a packet (e.g., 470, 475) transmitted over the network 320 for use by service nodes (e.g., 325, 410) providing a service for the mobile subscriber.

In some instances, mobile gateway 305 and policy control engine 310 can assign mobile subscribers IP addresses from a limited set of available IP addresses. Indeed, a policy control engine 310, for example, can assign the mobile subscriber one of the IP addresses in connection with a first transaction or session and, later, assign the same mobile subscriber a different IP address in connection with another transaction or session. Further, the number of mobile subscribers served by the mobile gateway can exceed the number of available IP addresses over a particular time period forcing the policy control engine 310 to occasionally re-use a recently- or concurrently-assigned IP address for assignment to another, distinct mobile subscriber. For instance, in the example illustrated in FIG. 4B, mobile subscriber 315 requests data for retrieval over IP/MPLS network 320, such as a website (such as described in connection with the example of FIG. 4A). During this first transaction, policy control engine 310 has assigned (at 355) mobile subscriber 315 an IP address of 1.10.1.1. Additionally, a particular service path name and service policy name can be retrieved corresponding to the particular mobile subscriber 315. Another mobile subscriber 450 can also be assigned IP address 1.10.1.1 by policy control engine 310.

The other mobile subscriber 450 can have its own corresponding subscriber data 455 including a service path and service policy name. In this particular example, mobile subscribers 315 and 450 can also consume an overlapping set of services, with each subscribed, in this example, to a content filtering service hosted by service node 325. The respective service paths of mobile subscribers 315 and 450, while both including the content filtering service, can, however, also include different network "hops." As an example, a packet (e.g., 470) corresponding to mobile subscriber's 315 data flow can have a first hop 365 to service node 325, a second hop 420 to service node 410, and a third hop 425 to web server 405. While the path of the other mobile subscriber 450 also includes a hop 465 to service node 325, the service path corresponding to the subscription of the other mobile subscriber 450 does not include the intrusion prevention service provided by service node 410, skipping (e.g., 485) instead to web server 405.

Given the overlap in service paths, in some instances, two separate packets can be transmitted to service node 325, each packet assigned the same IP address (e.g., 1.10.1.1) despite one packet originating from mobile subscriber 315, and the other originating from mobile subscriber 450. In order to further assist service node 325 in differentiating between the two packets, additional data 380 can be appended to the service header 370, such as a unique, IP-address-independent-identifier (e.g., a generic routing encapsulation (GRE) key, corresponding MSISDN, IMSI, MAC address, etc.) or other data, allowing the service node to identify how each packet is to be appropriately processed, billed, etc. For instance, each of mobile subscribers 315 and 450 can be subscribed to different content filtering policies. While the respective service headers 370a, 370b of mobile subscribers 315, 450 can include identifications (e.g., 374a, 374b) of the subscriber's preferred policies (as well as other identifiers, such as service path identifiers 372a, 372b), additional data 380a, 380b can be useful to ensure that the service node 325 does not confuse traffic from two different mobile subscribers 315 and 450 having the same IP address. For instance, in one example, mobile subscriber 315 can change their content filtering service policy, with the change reflected in substantially real time and memorialized in service headers sent by the mobile gateway 305 following the change. However, in an example where the mobile subscriber 315 changes their policy to a policy matching the policy of another mobile subscriber sharing the same IP address (e.g., subscriber 450), service node (e.g., 325) may potentially confuse the traffic of mobile subscriber 315 with that of the other subscriber, rather than recognizing that the traffic originates from subscriber 315 according to the subscriber's modified service policy.

In addition to an IP-address-independent-identifier or other data used to assist service nodes in differentiating between different mobile subscribers, additional or alternative data 380 can also be appended to payloads (e.g., 375a, 375b), such as to assist with billing of services provided by one or more service nodes (e.g., 325, 340, 410, etc.). In some instances, data reflecting a subscriber's account details may be desirable to share with outside service nodes. It may be equally desirable to protect the privacy of the subscriber's identity, providing an incentive to make any tags identifying a subscriber as generic as possible, thereby sharing some relevant subscriber account details while masking the remainder of the subscriber's information. For example, accounting start and/or end dates corresponding to a particular subscription's billing cycle can be appended to the service header 370 and payload 375. The accounting start/end date can correspond to a mobile subscriber's subscription to one or more particular services, for use, for example, in tracking traffic volume over a particular billing period. This data can be used by service nodes in connection with billing calculations, without exposing more direct subscription information to service nodes or network elements. Other data can also be appended by a mobile gateway 305 to payloads 375 of packets forwarded by the mobile gateway 305 to assist service nodes in providing services to mobile subscribers. Such data can be maintained by a policy control engine 310 or other data management utility and can be communicated, shared, maintained, and negotiated, for example, with other service nodes (e.g., 325, 340, 410) via the SB/SD module 330.

Using principles, functionality, and systems similar to those described above, mobile service routing and chaining can be achieved based on subscriber profile information stored in policy control records, such as in connection with an AAA, HLR, HSS, or policy server. With such functionality, mobile IP and services architectures can further adopt a cloud-like mobile services environment or architecture, implementing stateful, inline services to deploy service infrastructure. Accordingly, a mobile gateway node can understand not only subscribers and subscriber services but also service resources within the network infrastructure and build a dynamic forwarding plane. Indeed, in some implementations, a mobile operator may abstract the mobile gateway itself, with service routing established from the first point of IP presence (e.g., the mobile cellsite router, aggregation router, etc.) to a mobile gateway system that resides at least in part in a cloud computing environment. In other instances, a mobile operator may abstract only the services on the Internet-side of the mobile gateway, and instantiate services through the mobile gateway itself, where service routing is established directly from the gateway upstream interface to a service entity that resides in a cloud computing environment. Indeed, in some instances, a cloud-based mobile services environment can be realized, with the cloud computing environment containing virtual instances of a plurality of service nodes. The cloud computing environment may constantly be moving this virtual instance in order to optimize datacenter usage, resulting in multiple, dynamic changes to the service chain and routing within the service chain. Using the principles explained above, a communication system can be adapted to handle dynamic and request updating of service chain records and routing information, allowing mobile gateways to be notified and updated as a virtual service instance is modified.

Further, in some implementations, existing technologies and protocols can be leveraged using the principles described above. For instance, RADIUS and or DIAMETER can be used to implement out-of-band control plane signaling between service edge nodes, service brokers, and an improved mobile gateway. For instance, RADIUS Access Accept can be used to convey subscriber profile information augmented with forwarding function information, such as used in RADIUS Vendor-Specific Attributes (VSA), RADIUS Change of Authorization (CoA), or DIAMETER Re-Authorization Requests (RaR). Appropriate service path tunnels and transport mechanisms can then be built to support the delivery of the particular service chain based on the information conveyed.

Figure 5:
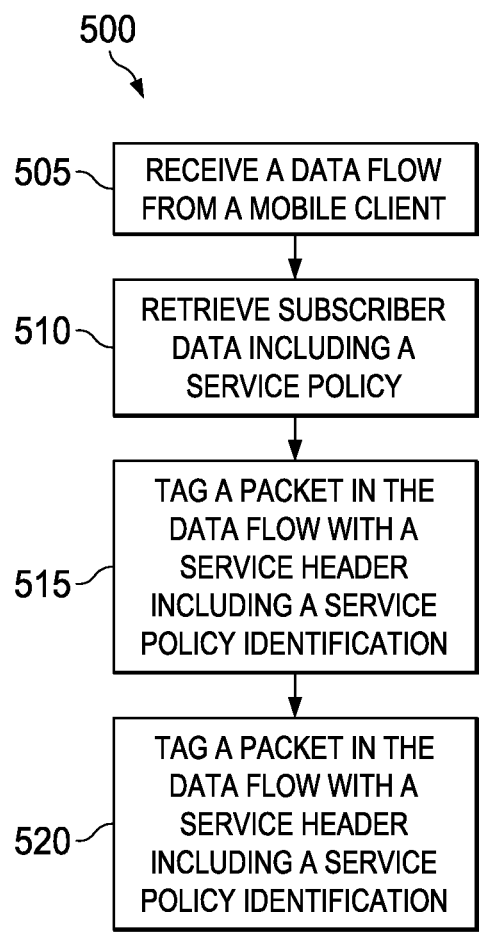
FIG. 5 is a simplified flowchart of an example technique for providing a service-aware mobile gateway.

Turning to FIG. 5, a simplified flowchart 500 is shown of an example technique for providing a service-aware mobile gateway. A data flow can be received 505 over a mobile network from a mobile client device associated with a first mobile subscriber. Additionally, subscriber data can be retrieved 510 for the first mobile subscriber. For instance, the subscriber can be retrieved (or received) from a policy control engine maintaining subscriber data for a plurality of subscribers in connection with the authentication of the mobile subscriber. The received subscriber data can include identification of at least one service path corresponding to the first mobile subscriber and at least one service policy corresponding to the first mobile subscriber. Packets in the data flow can be tagged 515 with service header data identifying the at least one first service policy. The service header data can also identify the at least one service path as well as other identification information such as the first mobile subscriber's IMSI and assigned IP address. Routing of the at least one packet over a core network, together with the service header, to service nodes in the identified service path can be initiated 520, each service node performing or providing at least a portion of a service included in a service subscription of the first mobile subscriber. The identified service path can include data used to realize particular hops over a core network to the one or more service nodes in the path. In some implementations the service header can further identify a service path corresponding to the first mobile subscriber as well as other data, such as an IP address, routing key, or other data. The service header can be used by network elements downstream from the mobile gateway, including service nodes providing services in the service subscription of the first mobile subscriber, to handle, route, and process the dataflow of the packet to which the service header is appended.

Note that in certain example implementations, providing a service-aware mobile gateway such as described in the implementations and related functions outlined herein may be implemented by logic encoded in one or more tangible machine-readable media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element (e.g., such included in mobile gateway 305 or policy control engine 310) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (e.g., such included in mobile gateway 305 or policy control engine 310) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, networking devices such as those shown or described in connection in any one of the above figures, may include software in order to achieve any of the functions outlined herein. Such networking devices can include memory elements for storing information to be used in achieving the functions and activities discussed herein. Additionally, such networking devices can further include a processor that can execute software or an algorithm to perform the operations and features disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, data structure, data record, tables, trees, cache, etc.) should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements, devices, or components. However, this has been done for purposes of illustration and example only. In certain cases, it may be easier to describe one or more of the functionalities of a given set of flows by only referencing a limited number of network elements. It should be appreciated that the described services and systems (e.g., 100) (and corresponding teachings) can be readily scalable and can accommodate a large number of components, as well as far more complicated/sophisticated arrangements and configurations. Accordingly, the examples provided should not limit the scope or inhibit the broad teachings of the above systems and services as potentially applied to a myriad of other architectures.

It is also important to note that the steps in the preceding flow diagrams illustrate only some of the possible signaling scenarios and patterns that may be executed by, or within, a communication system. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by a communication system (e.g., 100) in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., IGP, IGMP, etc.), communication system 10 may be applicable to other protocols and arrangements. Moreover, the present disclosure is equally applicable to various technologies, aside from DSL architectures, as these have only been offered for purposes of discussion. Along similar lines, communication systems implementing some or all of the above-disclosed features can be extended to any Multi-Protocol Label Switching (MPLS) architecture. Similarly, the teachings presented herein can also be used in loop free alternate (LFA) configurations in other embodiments.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking, cloud, and parallel processing may be advantageous.

What is claimed is:

1. A computer-implemented method comprising:
receiving a first data flow associated with a first subscriber and a second data flow associated with a second subscriber in a mobile network;
retrieving first subscriber data for the first subscriber and second subscriber data for the second subscriber, wherein the first subscriber data identifies a first service path, a first service policy associated with the first subscriber, and accounting date data corresponding to a service subscription of the first subscriber and the second subscriber data identifies a second service path and a second service policy associated with the second subscriber;
assigning a shared Internet protocol (IP) address to the first subscriber and the second subscriber;
generating a first IP-address-independent-identifier corresponding to the first subscriber and a second IP-address-independent-identifier corresponding to the second subscriber;
initiating routing of at least one packet of the first data flow over a network according to the first service path, the at least one packet including first service header data identifying, at least in part, the first service policy, the first service path, and the accounting date data; and
initiating routing of at least one packet of the second data flow over the network according to the second service path, the at least one packet including second service header data identifying, at least in part, the second service policy and the second service path.

2. The computer-implemented method of claim 1, wherein the first service path identifies one or more first service nodes to receive the first data flow associated with the first subscriber and wherein the second service path identifies one or more second service nodes to receive the second data flow associated with the second subscriber.

3. The computer-implemented method of claim 2, wherein the first service nodes and the second service nodes are different for the first data flow and the second data flow.

4. The computer-implemented method of claim 2, wherein the first service nodes and the second service nodes are the same for the first data flow and the second data flow.

5. The computer-implemented method of claim 4, further comprising:
appending the first service header data for one or more packets of the first data flow to include the first IP-address-independent-identifier for the first subscriber; and
appending the second service header data for one or more packets of the second data flow to include the second IP-address-independent-identifier for the second subscriber.

6. The computer-implemented method of claim 5, wherein the appending is performed for one of an initial packet or a last packet of the first data flow and for one of an initial packet or a last packet of the second data flow based on all the first and the second service nodes being stateful.

7. The computer-implemented method of claim 5, wherein the appending is performed for all packets of the first data flow and for all packets of the second data flow based on any of the first and the second service nodes being non-stateful.

8. The computer-implemented method of claim 1, wherein the second subscriber data includes accounting date data corresponding to a service subscription of the second subscriber and the second service header data further includes the accounting date data.

9. One or more non-transitory media that includes code for execution and when executed by a processor is operable to perform operations comprising:
receiving a first data flow associated with a first subscriber and a second data flow associated with a second subscriber in a mobile network;
retrieving first subscriber data for the first subscriber and second subscriber data for the second subscriber, wherein the first subscriber data identifies a first service path, a first service policy associated with the first subscriber, and accounting date data corresponding to a service subscription of the first subscriber and the second subscriber data identifies a second service path and a second service policy associated with the second subscriber;
assigning a shared Internet protocol (IP) address to the first subscriber and the second subscriber;
generating a first IP-address-independent-identifier corresponding to the first subscriber and a second IP-address-independent-identifier corresponding to the second subscriber;
initiating routing of at least one packet of the first data flow over a network according to the first service path, the at least one packet including first service header data identifying, at least in part, the first service policy, the first service path, and the accounting date data; and
initiating routing of at least one packet of the second data flow over the network according to the second service path, the at least one packet including second service header data identifying, at least in part, the second service policy and the second service path.

10. The media of claim 9, wherein the second subscriber data includes accounting date data corresponding to a service subscription of the second subscriber and the second service header data further includes the accounting date data.

11. The media of claim 9, wherein the first service path identifies one or more first service nodes to receive the first data flow associated with the first subscriber and wherein the second service path identifies one or more second service nodes to receive the second data flow associated with the second subscriber.

12. The media of claim 11, the operations further comprising:
appending the first service header data for one or more packets of the first data flow to include the first IP-address-independent-identifier for the first subscriber; and
appending the second service header data for one or more packets of the second data flow to include the second IP-address-independent-identifier for the second subscriber based on the one or more first service nodes being the same as the one or more second service nodes.

13. The media of claim 12, wherein the appending is performed for one of an initial packet or a last packet of the first data flow and for one of an initial packet or a last packet of the second data flow based on all the first and the second service nodes being stateful.

14. The media of claim 12, wherein the appending is performed for all packets of the first data flow and for all packets of the second data flow based on any of the first and the second service nodes being non-stateful.

15. A system comprising:
a policy control engine including at least one processor device and at least one memory element, the policy control engine adapted, when executed by the at least one processor device to:
assign an Internet protocol (IP) address to a first subscriber upon receiving an indication of a first data flow for the first subscriber; and
assign the IP address to a second subscriber upon receiving an indication of a second data flow for the second subscriber;
a routing module including at least one processor device and at least one memory element, the routing module adapted, when executed by the at least one processor device to:
retrieve first subscriber data for the first subscriber and second subscriber data for the second subscriber, wherein the first subscriber data identifies a first service path, a first service policy associated with the first subscriber, and accounting date data corresponding to a service subscription of the first subscriber and the second subscriber data identifies a second service path and a second service policy associated with the second subscriber;
generate a first IP-address-independent-identifier corresponding to the first subscriber and a second IP-address-independent-identifier corresponding to the second subscriber;
initiate routing of at least one packet of the first data flow over a network according to the first service path, the at least one packet including first service header data identifying, at least in part, the first service policy, the first service path, and the accounting date data; and
initiate routing of at least one packet of the second data flow over the network according to the second service path, the at least one packet including second service header data identifying, at least in part, the second service policy and the second service path.

16. The system of claim 15, wherein the first service path identifies one or more first service nodes to receive the first data flow associated with the first subscriber and wherein the second service path identifies one or more second service nodes to receive the second data flow associated with the second subscriber.

17. The system of claim 16, wherein the first service nodes and the second service nodes are different for the first data flow and the second data flow.

18. The system of claim 16, wherein the first service nodes and the second service nodes are the same for the first data flow and the second data flow.

19. The system of claim 16, wherein the routing module is further adapted, when executed by the processor to:
append the first service header data for one or more packets of the first data flow to include the first IP-address-independent-identifier for the first subscriber; and
append the second service header data for one or more packets of the second data flow to include the second IP-address-independent-identifier for the second subscriber based on the one or more first service nodes being the same as the one or more second service nodes.

20. The system of claim 15, wherein the second subscriber data includes accounting date data corresponding to a service subscription of the second subscriber and the second service header data further includes the accounting date data.

* * * * *